US012319369B2

(12) United States Patent
Pryor et al.

(10) Patent No.: US 12,319,369 B2
(45) Date of Patent: Jun. 3, 2025

(54) TANK SEAL INSPECTION

(71) Applicant: Board of Regents, The University of Texas System, Austin, TX (US)

(72) Inventors: Mitchell Pryor, Austin, TX (US); Andrew Zelenak, Manor, TX (US); Robert Blake Anderson, Austin, TX (US); Connor D. Crawford, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 588 days.

(21) Appl. No.: 17/431,988

(22) PCT Filed: Feb. 28, 2020

(86) PCT No.: PCT/US2020/020420
§ 371 (c)(1),
(2) Date: Aug. 18, 2021

(87) PCT Pub. No.: WO2020/176864
PCT Pub. Date: Sep. 3, 2020

(65) Prior Publication Data
US 2021/0380187 A1  Dec. 9, 2021

Related U.S. Application Data

(60) Provisional application No. 62/811,795, filed on Feb. 28, 2019.

(51) Int. Cl.
*B62D 57/024* (2006.01)
*B25J 5/00* (2006.01)
(Continued)

(52) U.S. Cl.
CPC ............ *B62D 57/024* (2013.01); *B25J 5/007* (2013.01); *B25J 19/023* (2013.01); *H04N 7/181* (2013.01); *B65D 88/42* (2013.01)

(58) Field of Classification Search
CPC ....... B62D 57/024; B25J 5/007; B25J 19/023; B25J 19/021; H04N 7/181; B65D 88/42
See application file for complete search history.

(56) References Cited

U.S. PATENT DOCUMENTS 5,205,174 A   4/1993  Silverman et al.
5,774,568 A   6/1998  Freneix
(Continued)

FOREIGN PATENT DOCUMENTS

CN      108214319 A      6/2018
WO   WO 2020/154303   *  1/2020   ............... B63G 8/00
(Continued)

OTHER PUBLICATIONS

Sogi, Tadayuki, et al. "Inspection robot for spherical storage tanks." 2000 26th Annual Conference of the IEEE Industrial Electronics Society. IECON 2000. 2000 IEEE International Conference on Industrial Electronics, Control and Instrumentation. 21st Century Technologies. vol. 1. IEEE, 2000. (Year: 2000).*

(Continued)

*Primary Examiner* — Russell Frejd
*Assistant Examiner* — Ana D Thomas

(57) ABSTRACT

Various embodiments generally relate to robotics and more specifically to tank seal inspections. In some embodiments, the robotic inspection device comprising a power supply, a body, a drive system, a camera, a navigational system, and/or one or more sensors. The drive system may include one or more surface engaging drivers to propel the robotic inspection device along a surface of a tank. The camera can be housed within the body to capture images and/or video of a seal. The navigational system can compute a route (or receive commands that route) and send commands to the drive system to navigate the robotic inspection device along the surface of the tank allowing the camera to capture the images or video of the seal. Some embodiments may use an (Continued)

artificial intelligence or machine learning engine to review the images or video of the seal and identify potential problems.

6 Claims, 23 Drawing Sheets

(51) Int. Cl.
  *B25J 19/02* (2006.01)
  *B65D 88/42* (2006.01)
  *H04N 7/18* (2006.01)

(56) References Cited

U.S. PATENT DOCUMENTS

| | | | |
|---|---|---|---|
| 6,882,412 B2* | 4/2005 | Silverman | G01N 21/954 356/237.1 |
| 8,171,786 B2 | 5/2012 | Burris | |
| 8,369,990 B2 | 2/2013 | Zesch et al. | |
| 8,666,553 B2 | 3/2014 | Phillips et al. | |
| 8,982,207 B2 | 3/2015 | Jang | |
| 9,250,213 B1 | 2/2016 | Bossi et al. | |
| 9,371,133 B2 | 6/2016 | Mays | |
| 9,586,636 B1 | 3/2017 | Burmeister et al. | |
| 10,012,561 B2 | 7/2018 | Walker et al. | |
| 2005/0252296 A1 | 11/2005 | Hock et al. | |
| 2009/0133515 A1 | 5/2009 | Gershtein et al. | |
| 2010/0107765 A1 | 5/2010 | Murakami et al. | |
| 2010/0180672 A1 | 7/2010 | Zollinger | |
| 2012/0281096 A1 | 11/2012 | Gellaboina et al. | |
| 2013/0231779 A1 | 9/2013 | Purkayastha et al. | |
| 2015/0285721 A1 | 10/2015 | Watanabe et al. | |
| 2015/0321605 A1 | 11/2015 | Mirza et al. | |
| 2015/0369751 A1 | 12/2015 | Cheim et al. | |
| 2016/0244988 A1 | 8/2016 | Barcelos et al. | |
| 2016/0268823 A1* | 9/2016 | Gonzalez | F17D 5/00 |

FOREIGN PATENT DOCUMENTS

| | | |
|---|---|---|
| WO | 2020154303 A1 | 7/2020 |
| WO | 2021/102079 A1 | 5/2021 |

OTHER PUBLICATIONS

Song, Young Kouk, et al. "Development of wall climbing robotic system for inspection purpose." 2008 IEEE/RSJ International Conference on Intelligent Robots and Systems. IEEE, 2008. (Year: 2008).*

Wang, Hua, et al. "A new inspection robot system for storage tank." 2008 7th World Congress on Intelligent Control and Automation. IEEE, 2008. (Year: 2008).*

A. Hak Industrial Services B.V., "Storage Tank Services," https://web.archive.org/web/20180916140922/http://www.a-hak-is.com/en/home/what_we_do/services/storage_tank_services/inspection/online_robotic_tank_bottom_inspection, 2 pages, Sep. 16, 2018.

Office of Industrial Technologies, U.S. Department of Energy, "Petroleum Project Fact Sheet," https://www.nrel.gov/docs/fy99osti/26044.pdf, 2 pages, Jan. 1999.

Sonomatic Ltd., "Robotic Tank Inspection," https://web.archive.org/web/20200219033419/http://www.sonomatic.com/advanced-inspection/applications/robotic-tank-inspection/, 1 page, Feb. 19, 2020.

Werner Solken, "Introduction To Storage Tanks," https://web.archive.org/web/20200227163205/http://www.wermac.org/equipment/storage_tanks_vessels_general.html, 16 pages, Feb. 27, 2020.

Wikipedia, "External Floating Roof Tank," https://en.wikipedia.org/wiki/External_floating_roof_tank, 2 pages, Aug. 23, 2019.

Wikipedia, "Fixed Roof Tank," https://en.wikipedia.org/wiki/Fixed_roof_tank, 1 page, Apr. 26, 2017.

Wikipedia, "Storage Tank," https://web.archive.org/web/20191114115825/https://en.wikipedia.org/wiki/Storage_tank, 4 pages, Oct. 22, 2019.

International Application No. PCT/US2020/020420, International Search Report & Written Opinion, 10 pages, May 14, 2020.

Kalra, Love P. et al., "A Wall Climbing Robot For Oil Tank Inspection," Proceedings of the 2006 IEEE International Conference on Robotics and Biometrics, pp. 1523-1528, Dec. 17-20, 2006.

* cited by examiner

TANK SEAL INSPECTION

CROSS-REFERENCE TO RELATED APPLICATIONS

This application claims priority to U.S. Provisional Application Ser. No. 62/811,795 filed Feb. 28, 2019, which is incorporated herein by reference in its entirety for all purposes.

TECHNICAL FIELD

Various embodiments of the present technology generally relate to robotics. More specifically, some embodiments of the present technology relate to an integrated system design for tank seal inspections.

BACKGROUND

Storage tanks can be used to store large quantities of substances. For example, refineries often have large storage tanks of petroleum products on site. The petroleum products can include crude oil, processed gasoline, kerosene, diesel, and the like. Depending on the flashpoint of the product and other factors, the large storage tanks can be fixed roof tanks or floating roof tanks. Fixed roof tanks (e.g., with cone roofs, dome roofs, etc.) are typically used to store liquids with very high flash points. Floating roof tanks are used for liquids with low flash points (e.g., gasoline, ethanol, etc.) and they are usually cheaper to build than fixed roof tanks. The floating roof may be internal or external.

External floating roof tanks, for example, typically include a cylindrical shell (e.g., made of steel) with an open top. A lid or roof sits within the cylindrical shell and floats directly on the surface of the stored liquid. This design keeps the air out of these storage tanks and prevents vapors from escaping. The lids float on the stored substance. As a result, the lid rises and falls with the liquid level, and there is no vapor space (ullage) in the floating roof tank except possibly in very low liquid level situations.

There is a seal between the lid and the wall of the tank which can degrade over time allowing for evaporation and product loss. As a result, these tanks must be inspected at regular intervals (e.g., annually, every five years, when tanks are empty, in accordance with internal policy, etc.) to ensure the seal is intact. Unfortunately, the inspection process is time consuming. For example, the inspection personnel are required to manually inspect the seals with full oxygen equipment. Moreover, the process usually requires various safety permits and multiple people onsite during the inspection which can last for several hours depending on the size of the tank. As such, a need exists for improved techniques for inspecting the storage tank seals.

SUMMARY

Various embodiments of the present technology generally relate to robotics. More specifically, some embodiments of the present technology relate to an integrated system design for tank seal inspections. Some embodiments provide for a robotic inspection device comprising a power supply, a body, a drive system, one or more cameras, a navigational system, and/or one or more sensors. In some embodiments, the housing may be a rectangle or box-shaped design. In some embodiments, can have multiple sections with different shapes and sizes. For example, the body of the robotic inspection device can have an upper portion and a lower portion. The lower portion may be smaller than the upper portion allowing for insertion into smaller spaces within the tank (e.g., between a floating lid and side of the wall of the tank). The drive system may include one or more surface engaging drivers (e.g., magnetic wheels, endless tracks, etc.) to propel the robotic inspection device along a surface of a tank. The one or more surface engaging drivers may be positioned, in accordance with one or more embodiments, on a back side and/or on a front side of the robotic inspection device.

The camera can be housed within the e body to capture images and/or video of a seal within the tank. The navigational system can compute a route and send commands to the drive system to navigate the robotic inspection device along the surface of the tank allowing the camera to capture the images or video of the seal. Navigation commands may or may not include a human operator in the control loop. Some embodiments may use an artificial intelligence, machine learning, or other analysis software engine(s) to review the images or video of the seal within the tank and identify problems with the seal. The software engine may be located within the robotic inspection device and/or on a remote computing platform. In some embodiments, the software engine can review the images or video of the seal and schedule additional passes over areas of the seal with identified issues. The issues may include poor image or video quality, fading, cracks, breaks, gaps, discolorations, or the like.

In some embodiments, the body may include an interchangeable nose section allowing an operator to select the interchangeable nose section with a size and a shape to fit between a weather shield affixed to the tank. The body or interchangeable nose section may include an opening allowing the lens of the camera to view the seal. In addition to the camera, these components of the robotic inspection device may also include one or more light sources (e.g., light emitting diodes) to illuminate an area of the tank (e.g., seal) for inspection. The light source, in some embodiments, may include two rows of multiple light emitting diodes (LED) positioned on opposite sides of the camera.

Some embodiments may include a manipulator arm having a proximal end coupled to the body of the robotic inspection device and a distal end connected to gripper to engage. The manipulator arm can be used to retract a weather shield on the tank to allow at least a portion of the robotic inspection device be inserted between the weather shield and a wall of the tank. Some embodiments of the robotic inspection device may also include a failsafe system with an independent power source and one or more direct current electromagnets. Upon failure of a primary power source the one or more direct current electromagnets can be automatically engaged to anchor the robotic inspection device to the surface of the tank.

Embodiments of the present invention also include computer-readable storage media containing sets of instructions to cause one or more processors to perform the methods, variations of the methods, and other operations described herein.

In some embodiments, a method of operating a robotic inspection device is provided. The robotic inspection device can be lowered into an initial position (e.g., using a hydraulic lift with cables attached to hooks located on the body of the robotic inspection device). An inspection signal requesting the robotic inspection device inspect a seal of a tank can be received (e.g., from an external computing device or control platform). Then, a magnetic coupling between the robotic inspection device and a wall of the tank can be activated. The robotic inspection device can be navigated so that a camera within the robotic inspection device can view a seal between a floating lid and the wall of the tank. Using the camera, images or video of the seal can be recorded as the robotic inspection device traverses the wall of the tank. In some embodiments, the images or video can be presented to a human operator for analysis. In other embodiments, an artificial intelligence, machine learning, or other analysis engine analyzes the images or video of the seal recorded by the camera. The images or video of the seal can be transmitted to an external computing device that creates a three-dimensional model of the seal.

In accordance with various embodiments, the robotic inspection device operates in a set of states including a setup state, an inspection state, and a failsafe state. The setup state can be used to receive commands from an operator or external computing platform. The inspection state can cause the robotic inspection device to capture sensor data and/or images/video of the seal. The robotic inspection device can monitor for a failure in a primary power supply providing power to the robotic inspection device and transition, upon detection of the failure in the primary power supply, from a current state of operation of the robotic inspection devices to a failsafe state that activates a magnetic coupling between the robotic inspection device and the wall of the tank. Some embodiments may use magnets for the magnetic coupling as the primary holding force in an inspection state and then transition to a second set of magnets and/or a secondary power supply when a fault is detected.

In some embodiments, the robotic inspection device features a system for determining, tracking, and reporting the position and orientation of the vehicle on the tank wall. Such a system may include odometers, gyroscopes, accelerometers, magnetic compasses, and/or GPS components. In embodiments that include a magnetic compass, the system is equipped with a method of calibrating the compass to account for the magnetic fields of the magnets on the vehicle.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
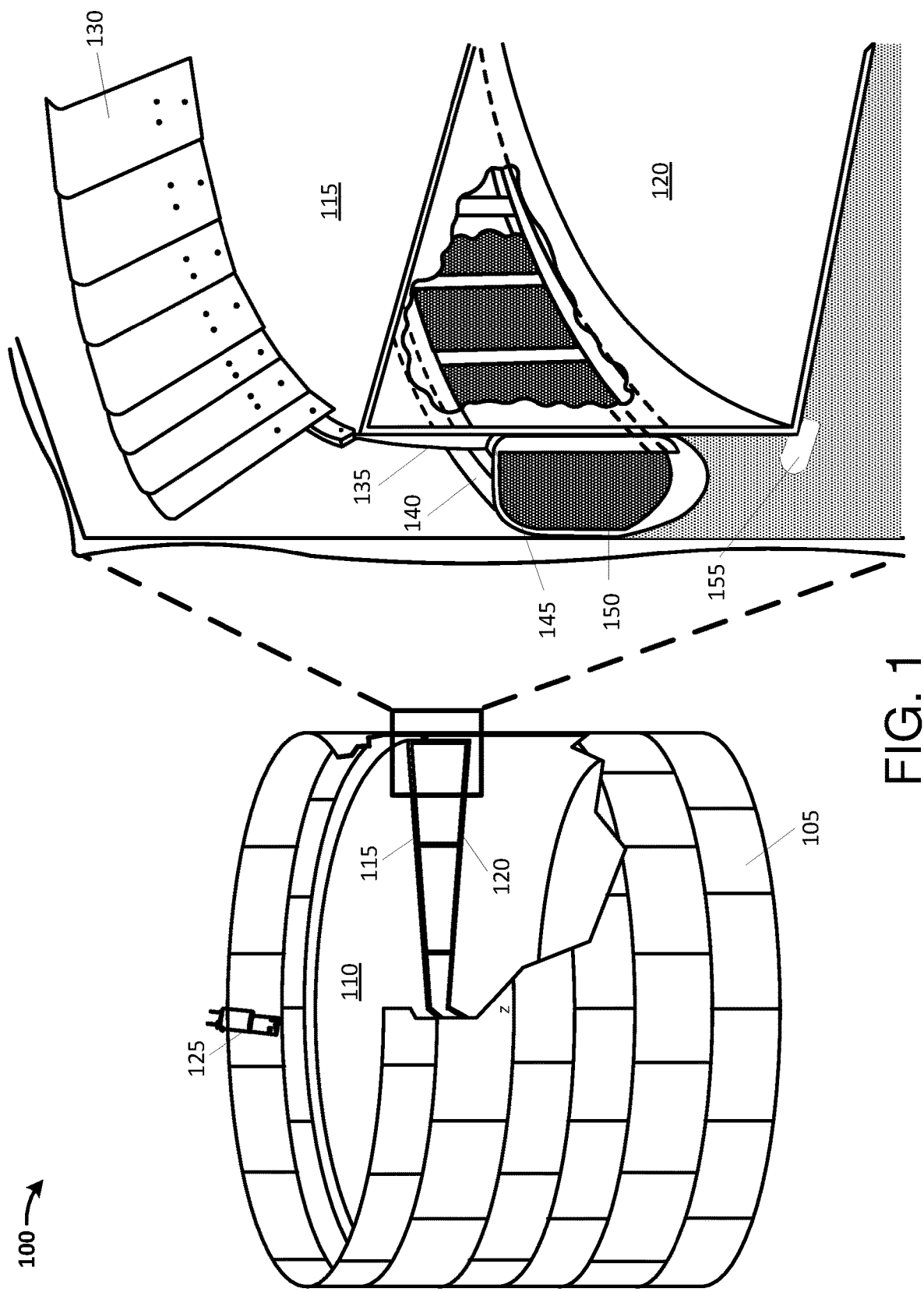
FIG. 1 illustrates an example of a tank with a seal that can be inspected by a robotic inspection device in accordance with one or more embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to robotics. More specifically, some embodiments of the present technology relate to an integrated system design for tank seal inspections. Oil and gas producers (among other types of companies) own many large tanks which have a "floating" roof. This roof moves up and down as the volume of material in the tank ebbs and flows. The seal between the roof and the wall of the tank must be inspected periodically, and inspection typically requires a human technician with an oxygen supply and a medical team on standby. The seals are often referred to as a "foam log" or a "wiper." The seal is often protected by a weather shield which must be lifted by the inspection technician. Historically, the technician manually inspects the seal and judges whether the condition of the tank seal is acceptable. The safety paperwork to approve a technician on the floating roof is onerous.

To avoid the expense associated with an oxygen supply and a medical team on standby, various embodiment of the present technology provide for a robotic inspection device which includes a camera and/or other sensors. The camera could be any combination of a traditional color camera, a stereo camera, a depth camera, or several other types of data collection systems. The robot can be lowered from the rim of the tank and inserted under the weather shield (if it exists). Then, the robotic inspection device would propel itself around the circumference of the tank, collecting data on the condition of the seal. An electromagnet (or magnet, or suction) might be used to hold the robot against the tank wall in some embodiments. As the robot traverses the tank, camera data can be saved. In some embodiments, a digital model of the tank seal can be recreated.

Various embodiments of the present technology provide for a wide range of technical effects, advantages, and/or improvements to tank inspections. For example, various embodiments include one or more of the following technical effects, advantages, and/or improvements: 1) use of an automated (or semi-automated) robotic inspection device to reduce or eliminate the lengthy approval process, oxygen supply, and a backup medical team that have historically made it very expensive to perform tank seal inspections with human technicians; 2) unconventional operations for the recreation of a high-fidelity 3D model of the tank seal; 3) integrated use of machine learning and/or artificial intelligence to automatically identify potential issues with the seal; 4) use of non-routine operations for reduction or removal of human judgment in seal inspections; 5) creation of detailed documentation; 6) the use of real-time feedback of video and sensor data to focus inspection on potential problem areas; and/or 7) use of interchangeable segments to allow for proper fitting of multiple different tank designs and configurations.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The robot can include various special-purpose hardware, programmable circuitry appropriately programmed with software and/or firmware, and the like.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a tank 100 with a seal that can be inspected by a robotic inspection device in accordance with one or more embodiments of the present technology. More specifically, FIG. 1 illustrates a typical external floating roof tank that can be used by various refineries or storage facilities. While FIG. 1 shows an external floating roof tank 100, the robotic inspection device may be used within other tank designs such as but not limited to internal floating roof tanks.

External floating roof tanks typically include a cylindrical shell 105 which can be made of steel or other metal depending on the stored liquid. The cylindrical shell 105 is open at the top and includes a floating lid 110. In the embodiments illustrated in FIG. 1, the floating lid 110 is a double decker lid that includes a top deck 115 and a bottom deck 120. The floating lid 110 is slightly smaller in diameter than the diameter of the cylindrical shell 105. The floating lid 110 sits atop the liquid within the tank and will rise or fall with the liquid level. In some designs, floating lid 110 may sit on pontoons floating on the liquid. As a result, there is little or no space between the bottom of lid 110 and the top of the liquid internal to the tank 100.

While not illustrated in FIG. 1, the floating lid 110 may include vents and or access ports to allow inspection personal to view or gain access to the inside of the tank 100. Around the floating lid 110 sits a seal to provide an airtight connection between the floating lid 110 and the cylindrical housing 105. Robotic inspection device 125 can be lowered down the inner wall of the cylindrical housing 105. The right side of FIG. 1 provides a cross section of an enlarged portion of the seal between the floating lid 110 and the cylindrical housing 105.

Attached to the upper deck 115 is a weather shield 130. A seal assembly can be positioned underneath the weather shield 130 and between the cylindrical wall 105 and floating lid 110. In the embodiments shown in FIG. 1, the seal assembly can include a hanging bar 135 attached to the floating lid 110 to secure seal envelope 140 with seal support ring 145 and resilient urethane foam 150.

Figure 2:
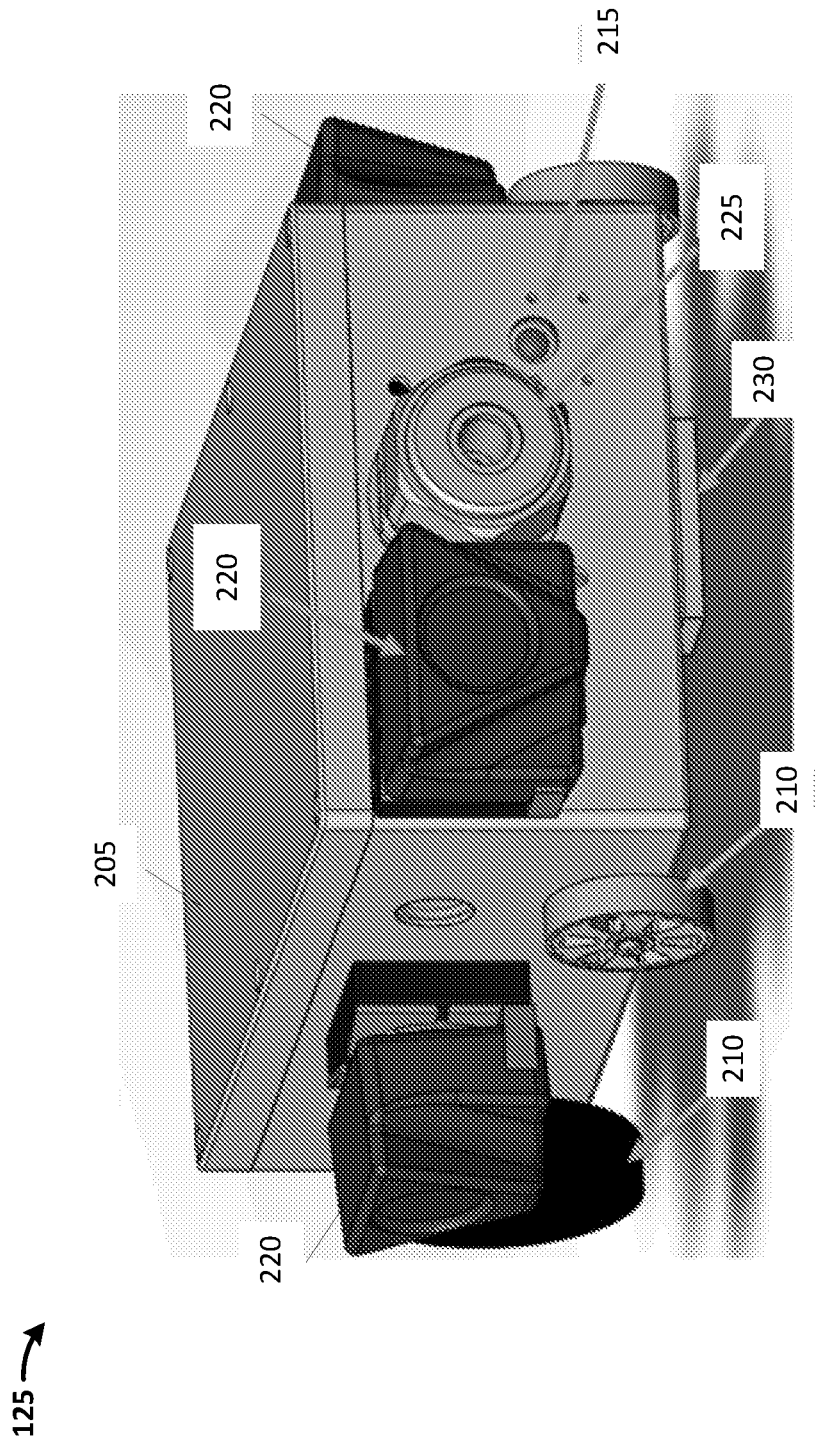
FIG. 2 illustrates an example of a robotic inspection device according to various embodiments of the present technology.

FIG. 2 illustrates an example of a robotic inspection device 125 according to various embodiments of the present technology. As shown in FIG. 2, robot inspection device 125 is a smaller robot that passes entirely underneath the weather shield (see, e.g., weather shield 130 in FIG. 1). A typical weather shield will restrict the robot height to less than six inches and the robot width to less than eighteen inches. Some embodiments may have a height equal to or greater than six inches and/or a width equal to or greater than eighteen inches. Length is a less critical dimension and can be minimized to maximize the robot mobility.

As Illustrated in FIG. 2, the robot inspection device may include a housing 205 (e.g., having a rectangular shape). The housing can be made from a variety of materials including, but not limited to, plastics, metals, composite materials, or the like. In accordance with various embodiments, the material may be suitable for deployment in explosive vapor environments and be compliant with regulations pertaining to those environments. For example, the material must not produce sparks due to contact with other objects and be rugged enough to survive outdoor environments. Housing 205 can enclose a variety of components such as, but not limited to power sources (e.g., a battery), processors, controller, drive assemblies, magnetic coupling assemblies, sensors, lights, drive motors, and/or other components.

In the embodiments shown in FIG. 2, the drive motors are connected to wheels 210 (e.g., larger drive wheels and smaller idler wheels) allowing the robotic inspection device to drive around the tank in the space between the weather shield and seal. Camera 215 can be mounted on or within housing 205 (e.g., on each side) to capture images of the seal. The embodiments of robotic inspection device 125 shown in FIG. 2 are designed to passes underneath the weather shield. As such, a worker can pull the weather shield back during initial deployment. Since robotic inspection device 125 cannot be seen by the operator (since the robotic inspection device is concealed by the weather shield) a navigation system can be used to track the robot position under the weather shield. Flashlights 220 can illuminate an area underneath the weather shield.

In some embodiments, robotic inspection device 125 can be teleoperated and/or equipped with object manipulation and detection capabilities provide a safe option for executing dangerous tasks in hazardous environments without putting humans at direct risk. In the embodiments shown in FIG. 2, tether attachment point 225 can be used to attach a tether allowing commands from an operator to be processed. In some embodiments, robotic inspection device 125 may also include wireless components to receive commands without attachment of the tether. In addition, various embodiments may include a variety of components (e.g. housed within housing 205 or on an ground-station computer) to provide environmental awareness. Examples include, but are limited to displays for video feed navigation and use of assisted or automated video analysis tools to determine seize of fixture gaps. Static magnet 230 can be activated to secure robotic inspection device to a magnetic wall of the tank or portion of the weather shield.

Figure 3:
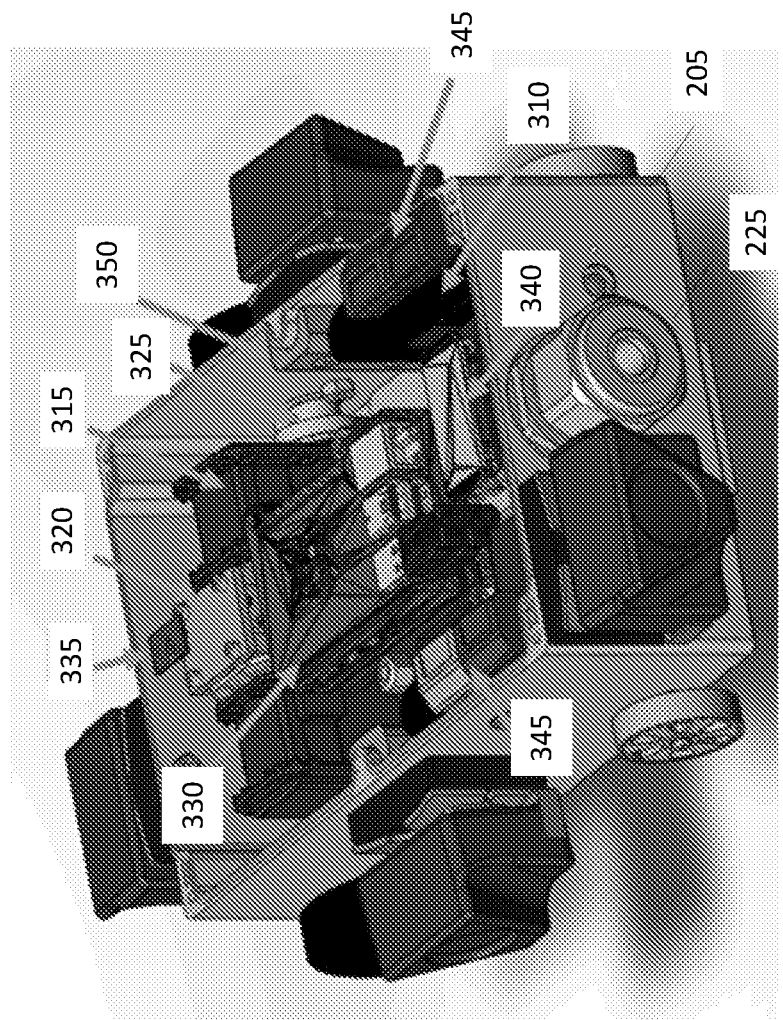
FIG. 3 is an illustration that allows various internal components to be seen of a portion of the robotic inspection device illustrated in FIG. 2.

FIG. 3 is an illustration 300 that allows various internal components to be seen of a portion of the robotic inspection device 125 illustrated in FIG. 2. In the embodiments illustrated in FIG. 3, robotic inspection device 125 can include one or more apertures allowing for camera assemblies 310 within housing 205 to capture video, images, or data. Apertures may also allow light (e.g., from an LED within the housing) to illuminate the area under the weather shield.

Drive motors (e.g., servos) 315 may be mounted on chassis mount 320 and be part of a differential drive system allowing the drive wheels 210 to independently move. Servo-axle couplings As such, by changing the relative rate of rotation of drive wheels, robotic inspection device 125 can navigate obstacles or reach desired destinations without additional steering components. While various embodiments may include load-bearing wheels and/or drive wheels, alternative surface-engaging drivers such as endless tread (e.g., tracks) may be used in some embodiments. Note that the drive system will have to be sufficient to overcome the friction between the vehicle and the weather shield. Otherwise, the robotic inspection device 125 could get stuck.

Computational device 330 can be configured to take instructions from a remote operator and translate those commands into a tasks to be completed by the robotic inspection device. In accordance with various embodiments, computational device 330 can provide control and integration of various sub-systems (e.g., vehicle motion, environmental awareness and detection, navigation, etc.). In some embodiments, the vehicle motion can be computed and set to change vehicle motion, servo speed/torque, estimate or determine vehicle velocity and drift. The computational device may decide to maintain vehicle position, engage or disengage magnetic couplings (e.g., block and/or wheel magnets, determine orientation of the vehicle, or the like. In some embodiments, computational device 330 can determine the size of a gap using depth camera, initialize and calibrate various cameras to improve 3D images, or the like. In the embodiments illustrated in FIG. 3, computational device 330 can be communicably coupled to inertial measurement unit (IMU) board 335.

The robotic inspection device may also include voltage converters 340 to change the voltage levels received through tether attachment point 225 (or from one or more internal power supplies) from one voltage to another (e.g., from 12 volts to 5 volts or 3.3 volts). Power distribution units 345 can then provide appropriate power to the various components (e.g., computational device 330, drive motors 315, IMU board 335, flashlights 350, etc.).

Figure 4:
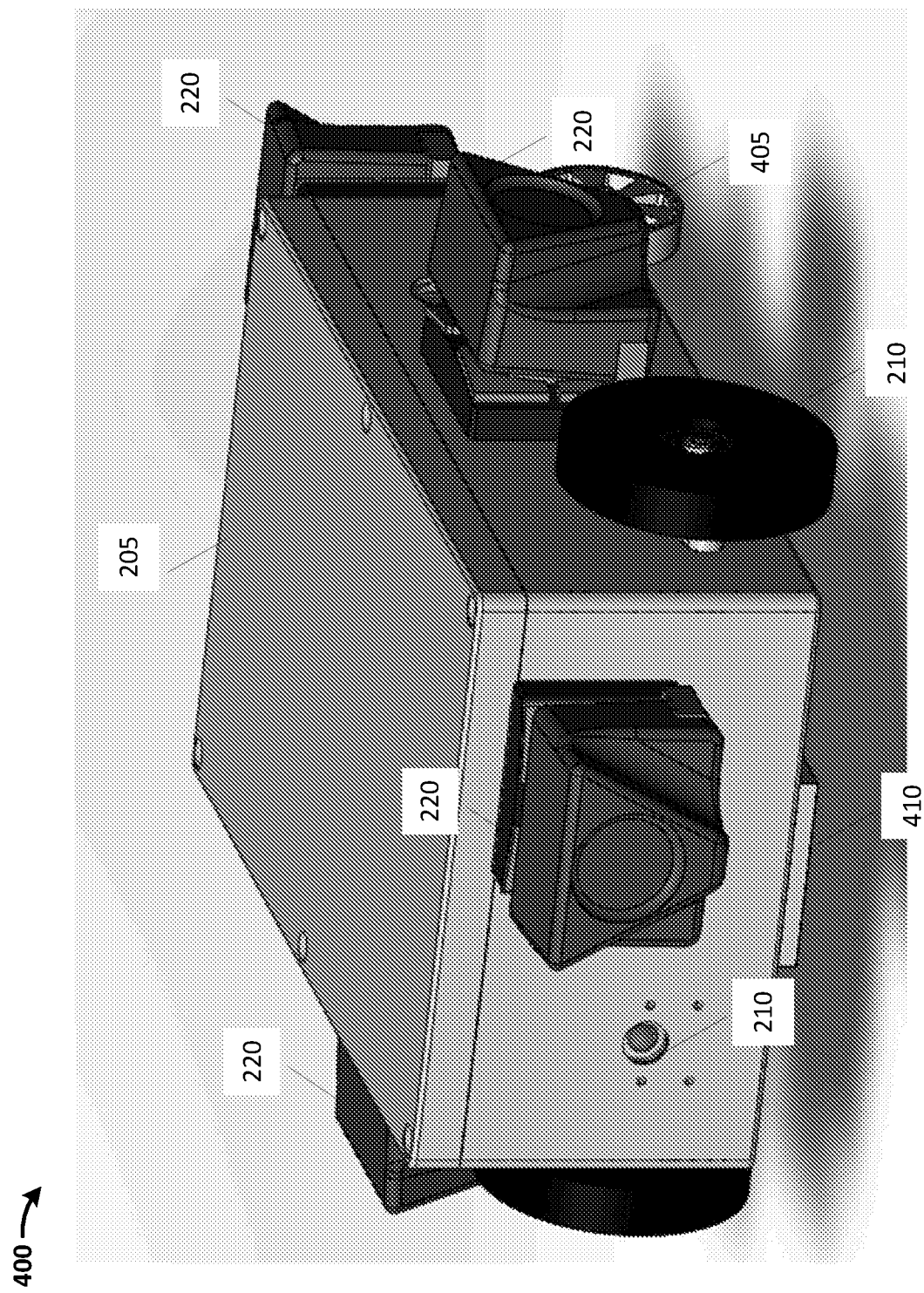
FIG. 4 is a front view of the robotic inspection device of FIGS. 2-3.

FIG. 4 is a front perspective view 400 of the robotic inspection device of FIGS. 2-3. As illustrated in the embodiments shown in FIG. 4, component 405 is an example of a location of a support wheel or caster on the bottom of the vehicle towards the rear. One, two, or more such support wheels or casters may be used. Component 410 illustrates possible locations for the adhesion magnets. The number, shape, strength, and locations of the magnets may vary. Magnets may be located closer to the edges of the vehicle bottom. Magnets may be installed on the wheels instead of, or in addition to, the vehicle bottom.

Figure 5:
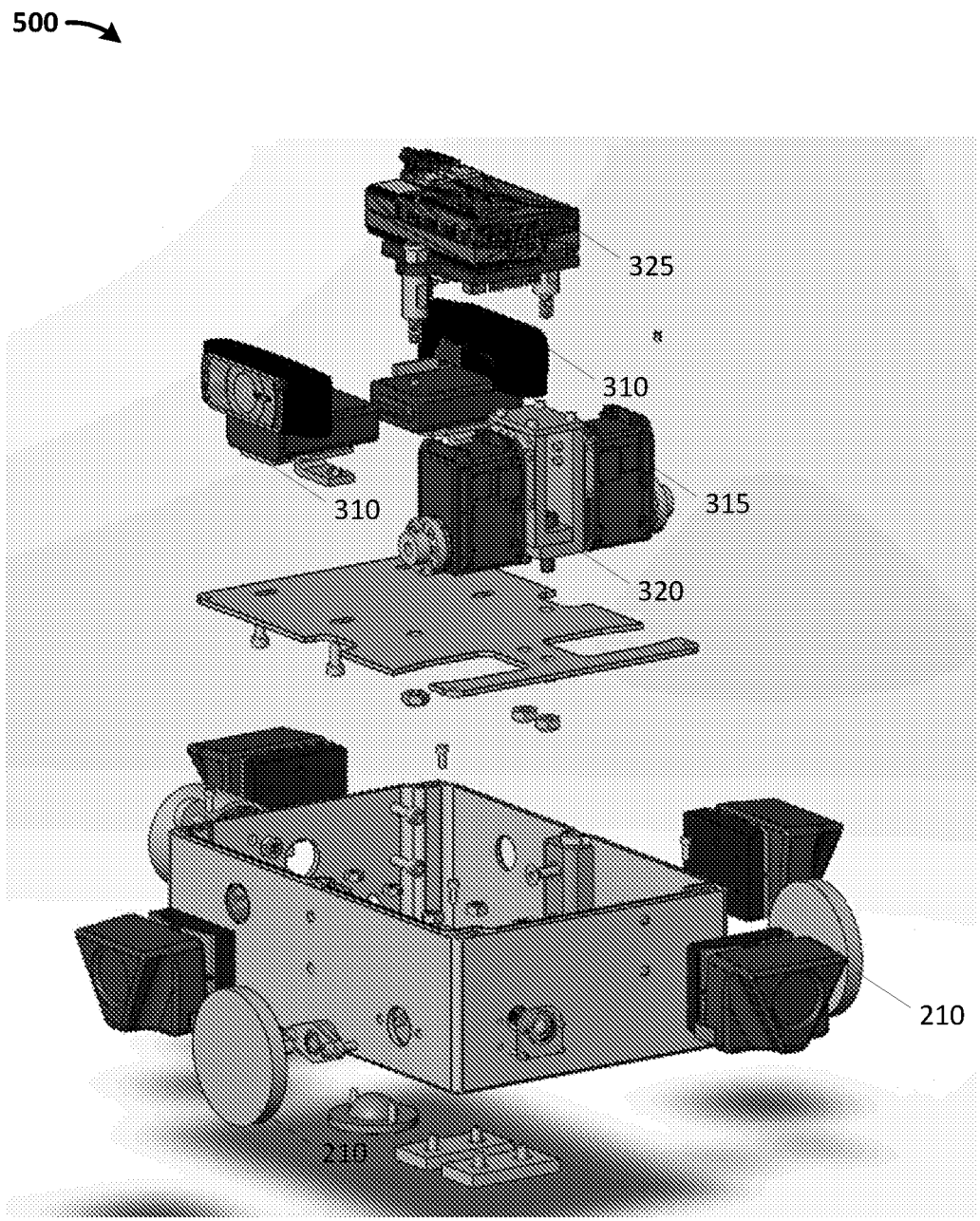
FIG. 5 is an exploded view showing various components of the robotic inspection device of FIGS. 2-4.
Figure 6:
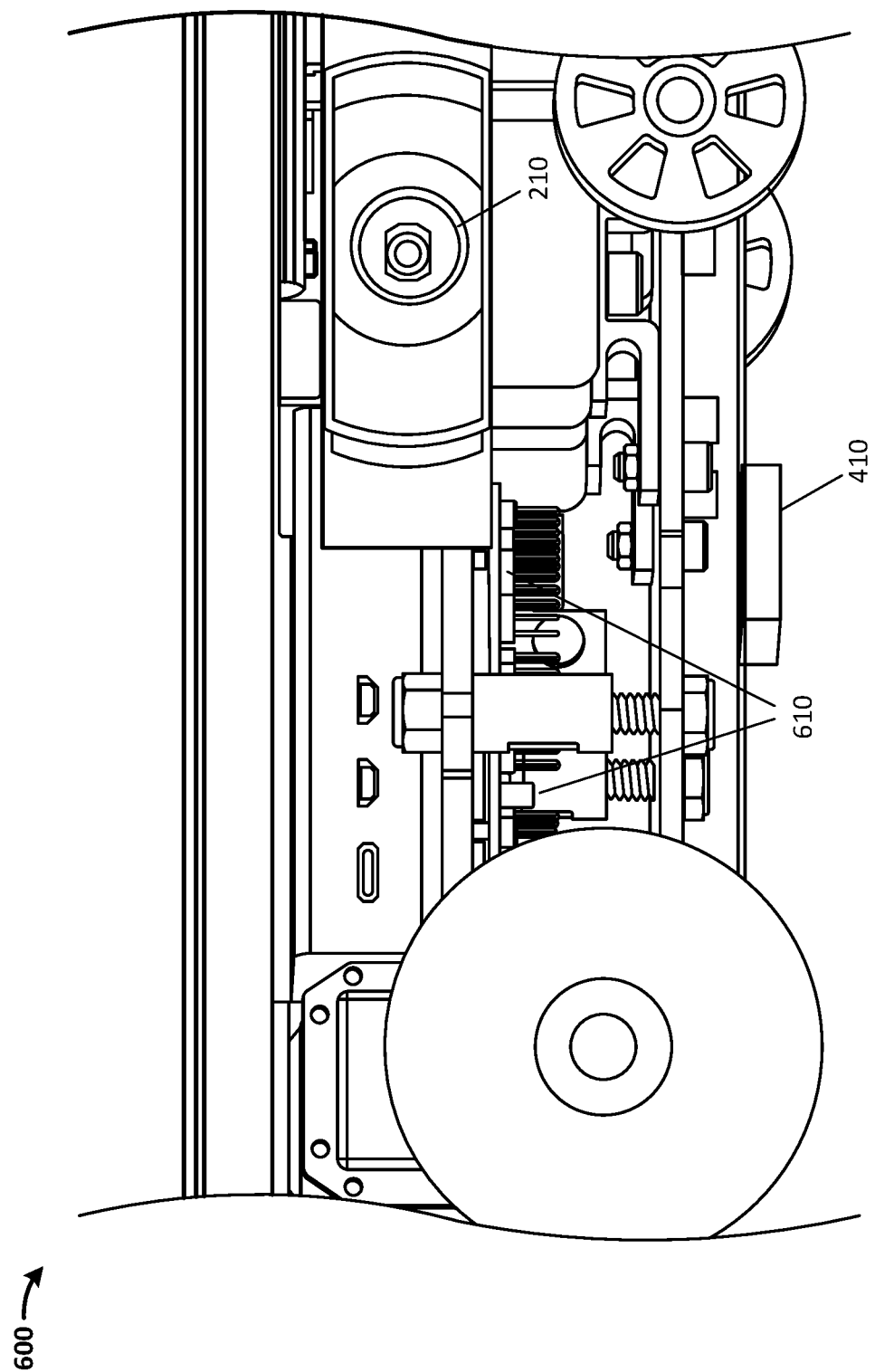
FIG. 6 is a side view showing various components of the robotic inspection device of FIGS. 2-5.
Figure 7:
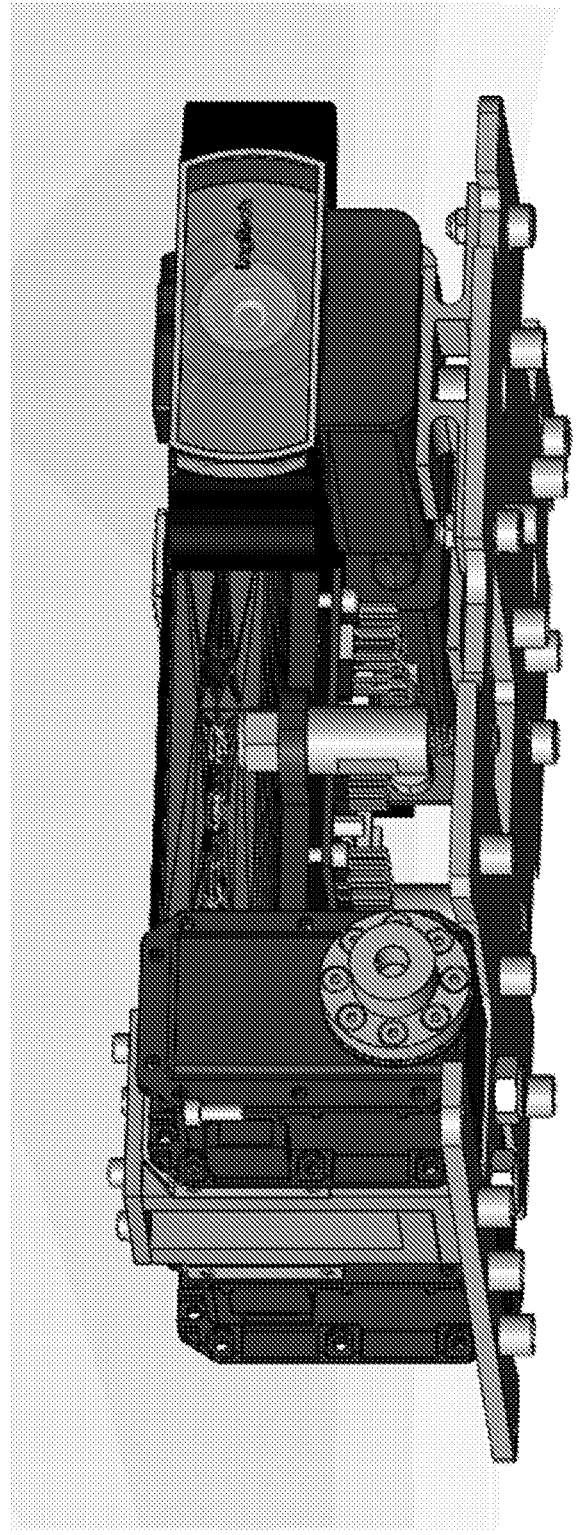
FIG. 7 is a perspective view of an electronic assembly that may be used within various embodiments of the present technology.

FIG. 5 is an exploded view 500 showing various components of the robotic inspection device of FIGS. 2-4. Component 315 is the motors for the drive wheels 210. Component 310 is the side-vision cameras. The specific make and model of the cameras may vary. Component 320 is the mounting subassembly for the drive motors. Component 325 is the onboard computer. FIG. 6 is a side view 600 showing various components of the robotic inspection device of FIGS. 2-5. In addition to side camera 215 and static magnet 410, the embodiments shown in FIG. 6 also include serial controller and sensor board 610 which provides an interface to the various components and sensors within the robotic inspection device. FIG. 7 is a perspective view 700 of an electronic assembly that may be used within various embodiments of the present technology.

Figure 8:
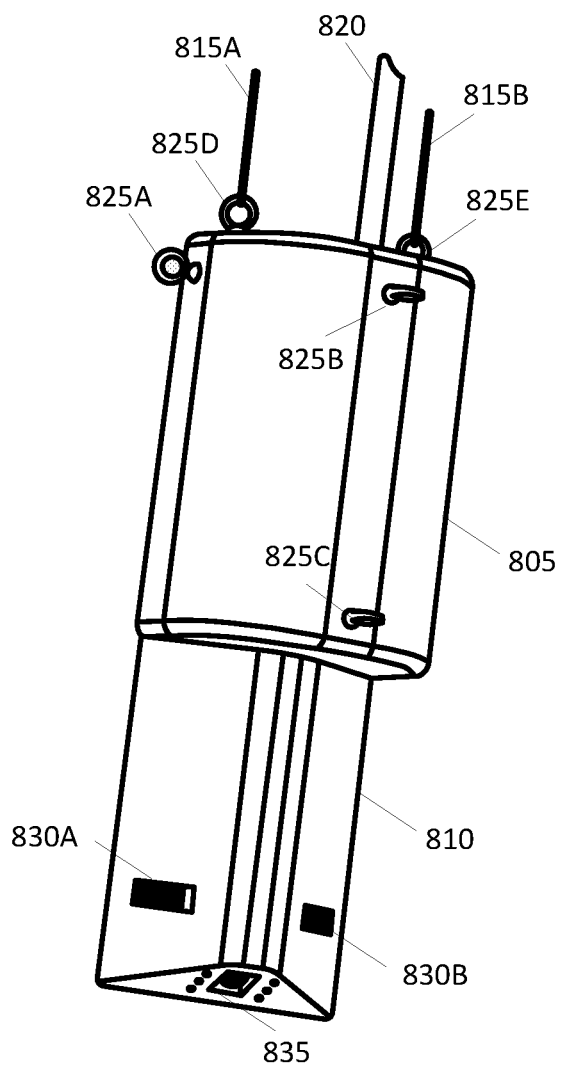
FIG. 8 is a view of an example robotic inspection device, illustrating various embodiments of the present technology.

While robotic inspection device 125 illustrated in FIG. 2 is designed to fit entirely underneath the weather shield. Other embodiments may include housing designs that only partially fit underneath the weather shield. One advantage of these embodiments is that it allows the operator to visually see the location of the robotic inspection device. FIG. 8 is a view of a robotic inspection device 125 in accordance with various embodiments of the present technology. As shown in FIG. 8, robotic inspection device 125 inspection device can have a body with an upper portion 805 and a lower portion 810. Within the upper portion 805 and/or the lower portion 810, the robotic inspection device 125 can include various power sources (e.g., a battery), processors, controller, drive assemblies, magnetic coupling assemblies, sensors, lights, drive motors, and/or other components. The lower portion 810 may be smaller than upper portion 805 to allow the lower portion 810 to pass the weather shield and visually access the seal between the floating lid and the cylindrical shell of the tank. The upper portion 805 may be attached to cables 815A and 815B for lowering and raising the robotic inspection device into place. In addition, some embodiments may use tether 820 for providing additional power and/or communication between external computing devices and the robotic inspection device. Tether 820 may include a Kevlar covering to protect the internal cables providing the power and communications.

The cables 815A and 815B may be connected to any of eyebolts 825A-825E. Once the device is set into place, a magnetic or suction based engagement system may be used to secure the robotic inspection device 125 to the all. The cables 815A and 815B can be unclipped and removed from the robotic inspection device 125. A pair of load-bearing wheels 830A-830B may be located outside of lower portion 810. Additional wheels may be located on the opposite side of the robotic inspection device (see, e.g., FIG. 11). Each of these wheels may be powered by a drive assembly (not shown) or rotate freely.

In addition, to load-bearing wheels 830A-830B, various embodiments may also include drive wheels (see, e.g., FIG.

11, wheels 1110A-1110B and 1110D-1110E) which may be part of a differential drive system allowing the drive wheels to independently move. As such, by changing the relative rate of rotation of drive wheels 1110A-1110B and 1110D-1110E, robotic inspection device 125 can navigate obstacles or reach desired destinations without additional steering components. While various embodiments may include load-bearing wheels 830A-830B and/or drive wheels 1110A-1110B and 1110D-1110E (in FIG. 11), alternative surface-engaging drivers such as endless tread (e.g., tracks) may be used in some embodiments.

While not illustrated in FIG. 8, some embodiments of the robotic inspection device 125 may include a manipulator arm. The manipulator arm can be connected to a portion of the body (e.g., upper portion 805 or lower portion 810) of the robotic inspection device 125. For example, a proximal end of the manipulator arm can be coupled to the body and a distal end connected to one or more tools (e.g., a gripper for lifting the weather shield or grabbing the seal, a rod for prodding the seal, additional cameras, and the like) for inspecting and/or gaining access to the seal. The manipulator arm can include multiple segments connected by actuated joints to allow the manipulator arm flexibility in performing desired tasks.

The design of tank seals varies and there is no guarantee that one robot design will work for all tank types. As such, various embodiments allow for interchangeable segments and/or portions with different sizes, shapes, curvatures, and the like. For example, in some embodiments, the robotic inspection device may include an interchangeable nose piece, an interchangeable lower portion, or a back with different curvatures. Moreover, some tanks have irregular structural additions on the rim of the tank, such as antennas or irregular flanges. As such, it will be difficult for the power/communications tether 820 to pass over these obstructions. Various embodiments may use an onboard battery and Wi-Fi module to operate the robotic inspection device wirelessly. In other embodiments, the cable may be fed over these obstructions with a long pole or a hydraulic lift.

While not illustrated in FIG. 8, some embodiments may include a second assembly that follows the robotic inspection device along the top of the tank. The follower assembly allows the tether to be threaded to the vehicle and supports recovery of the vehicle from the tank.

Figure 9:
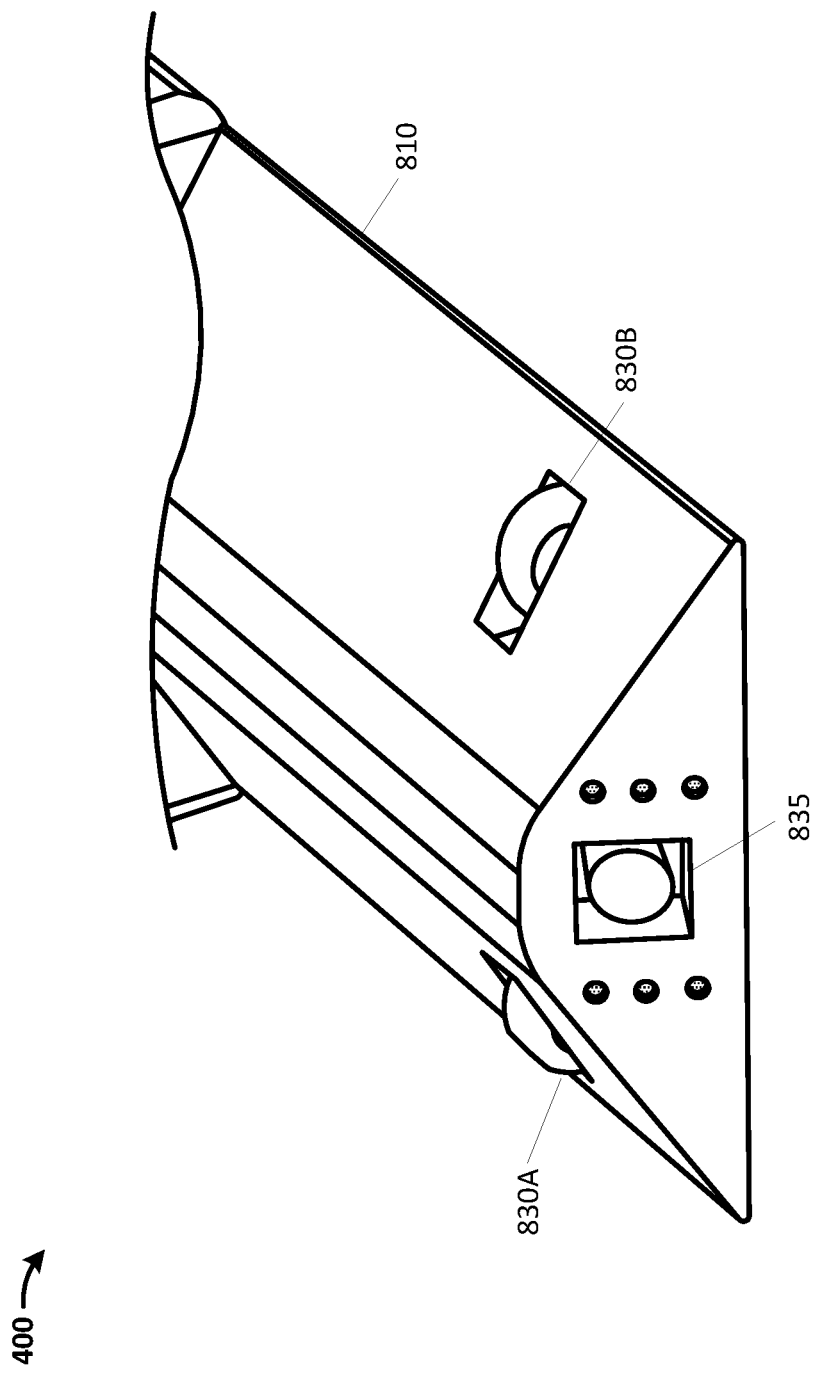
FIG. 9 illustrates a design of a lower portion of the robotic inspection device shown in FIG. 8.

FIG. 9 illustrates a design of a lower portion 810 of the robotic inspection device shown in FIG. 8. At the bottom of the lower portion 810 can be one or more integrated sensors 835 and/or lights for inspecting the seal. In accordance with various embodiments, the integrated sensors may include video cameras, thermal sensors, chemical sensors, and the like. The recordings and measurements from the integrated sensors 835 may be stored locally within the robotic storage device and retrieved once the inspection is complete. In other embodiments, the recording and measurements may be streamed back to a remote computing device where the results can be analyzed in real-time. This real-time analysis can allow for additional data to be collected in suspect areas or areas of interest.

Figure 10:
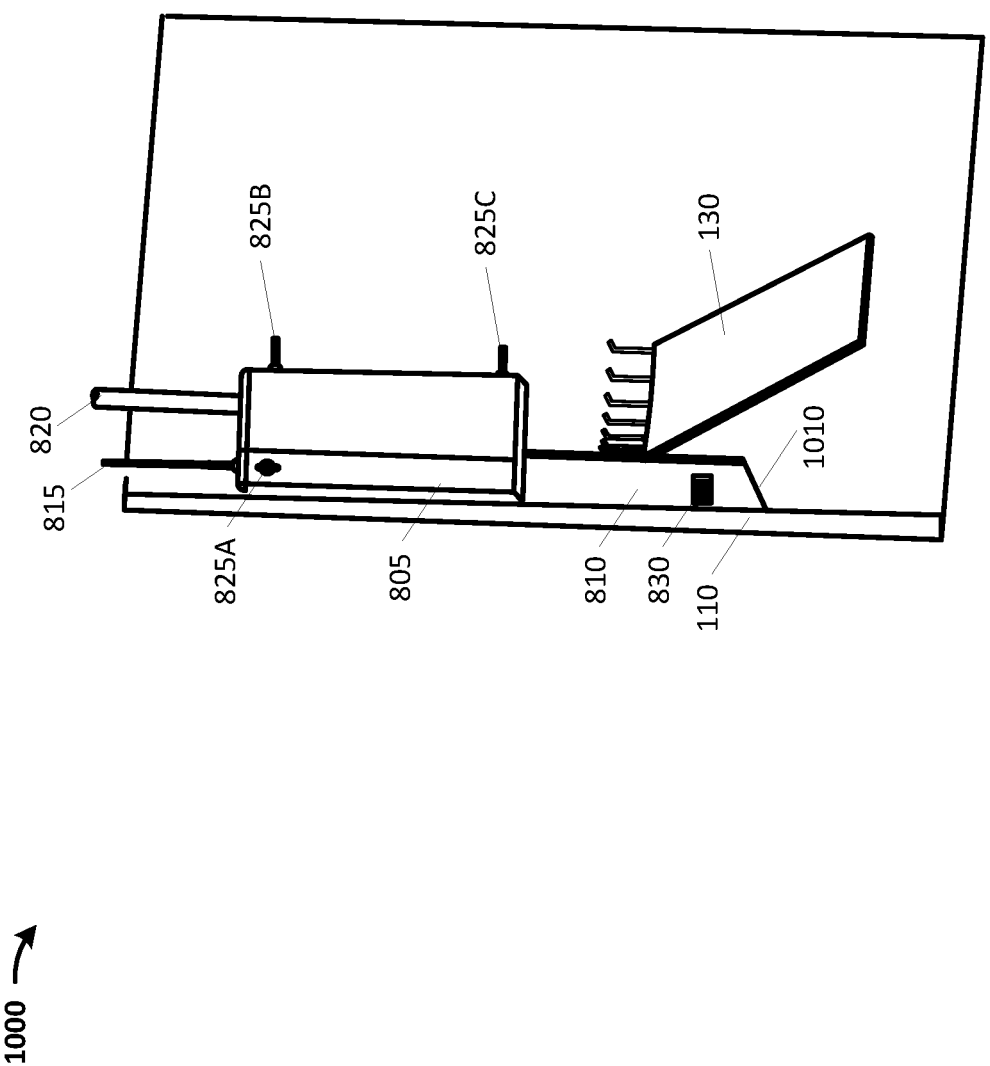
FIG. 10 illustrates a view of the robotic inspection device with a lower portion inserted beyond a weather shield on a tank for inspection of a seal in accordance with some embodiments of the present technology.

FIG. 10 illustrates a view 1000 of the robotic inspection device 125 with the lower portion 810 inserted beyond the weather shield 130 on the tank 100 for inspection of a seal in accordance with some embodiments of the present technology. The weather shield 130 may be manually retracted by an operator using a pole-mounted tool. In other embodiments, the lower portion 810 of robotic inspection device 125 may include a manipulator arm (not shown) with an access tool to create space between the top edge of the weather shield 130. In other embodiments, the wedge-shaped leading edge 1010 of the lower portion 810 may allow the robotic inspection device to drive beneath the weather shield. This can allow the robotic inspection device 125 access to the seal. The wheels 830A-830B on the front of the inspection device may engage the weather shield as the device navigates around the internal perimeter of the shell.

Figure 11:
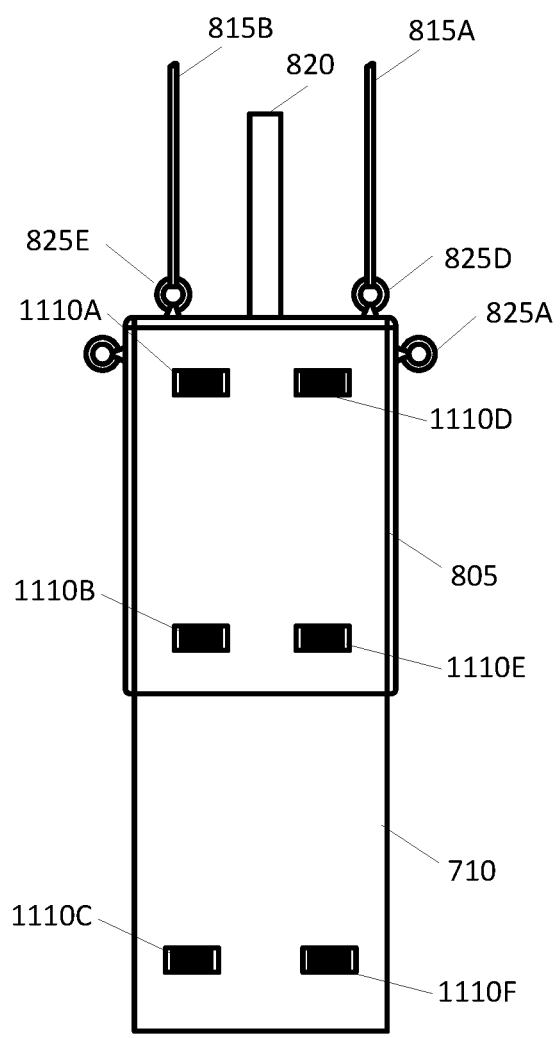
FIG. 11 is a view of the back the robotic inspection device that may be used in various embodiments of the present technology.

FIG. 11 is a view 1100 of the back of the robotic inspection device 125 that may be used in various embodiments of the present technology. In the embodiments shown in FIG. 11, upper portion 805 and lower portion 810 may each include sets of wheels 1110A-1110F. Some of the wheels may be load-bearing wheels similar to wheels 830A-830B, while other wheels may be drive wheels which are part of a differential drive system allowing drive wheels to independently move. As such, by changing the relative rate of rotation of drive wheels 1110A-1110F, robotic inspection device 125 can navigate obstacles or reach desired destinations without additional steering components. Other embodiments may use alternative surface-engaging drivers such as endless tread (e.g., tracks). The back side of upper portion 805 and lower portion 810 may be flat. In some embodiments, the back side of upper portion 805 and/or lower portion 810 may be slightly rounded to fit with common curvatures of the cylindrical shells.

Figure 12:
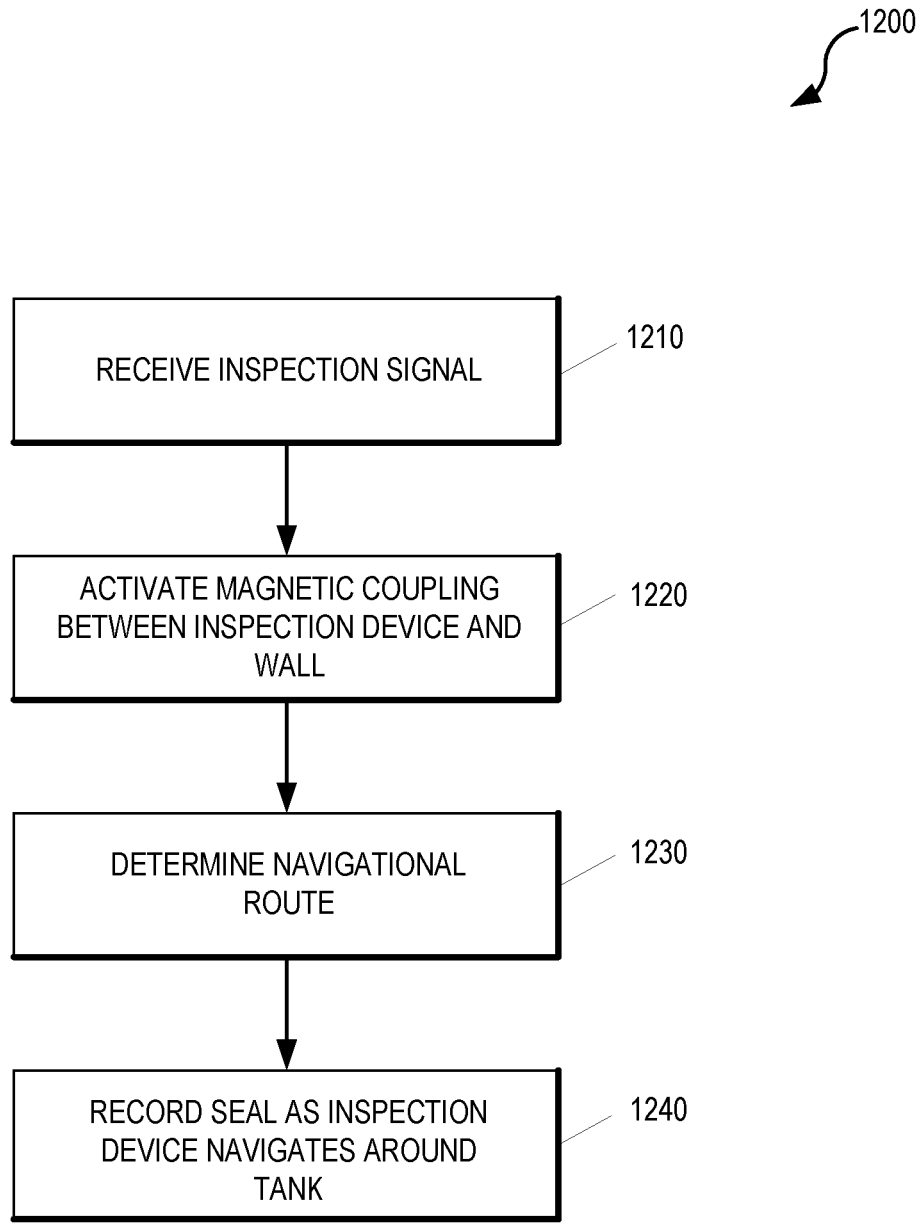
FIG. 12 is a flowchart illustrating an example of a set of operations for using the robotic inspection device in one or more embodiments of the present technology.

FIG. 12 is a flowchart illustrating an example of a set of operations 1200 for using the robotic inspection device in one or more embodiments of the present technology. As illustrated in FIG. 12, receiving operation 1210 receives an inspection signal from a controller. The inspection signal may be sent wirelessly or via a wire routed to the robotic inspection device via a tether. The inspection command may include a variety of parameters such as, but not limited to, tank dimensions (e.g., diameter), inspection routines, identified areas of interest, areas to avoid, and the like. Other examples of parameters may include time limits, communication channel information, location/tank information (e.g., for tagging recorded data), external weather conditions (e.g., temperature), maximum inspection times, waypoints, and the like.

Activation operation 1220 can activate a magnetic coupling between the robotic inspection device and the wall of the tank once the robotic inspection device is in place. The magnetic coupling can support the weight of the robotic inspection device and allow the drive wheels to be used to navigate the robotic inspection device around the inner perimeter of the tank. Determination operation 1230 then determines (e.g., using the parameters from the inspection command, from selection of a pre-planned path, etc.) a navigational route for the robotic inspection device. The navigational route may avoid known obstacles and may be dynamically updated (e.g., based on sensor measurements) as the robotic inspection device navigates the tank's inner perimeter. Recording operation 1240 can use the sensors to inspect the seal located below the weather shield. If a seal fault is detected, additional measurements (e.g., from different angles or using different sensors) may be taken in some embodiments. As such, the inspection process may dynamically depend on the measurements being recorded, external commands, and the like.

Figure 13:
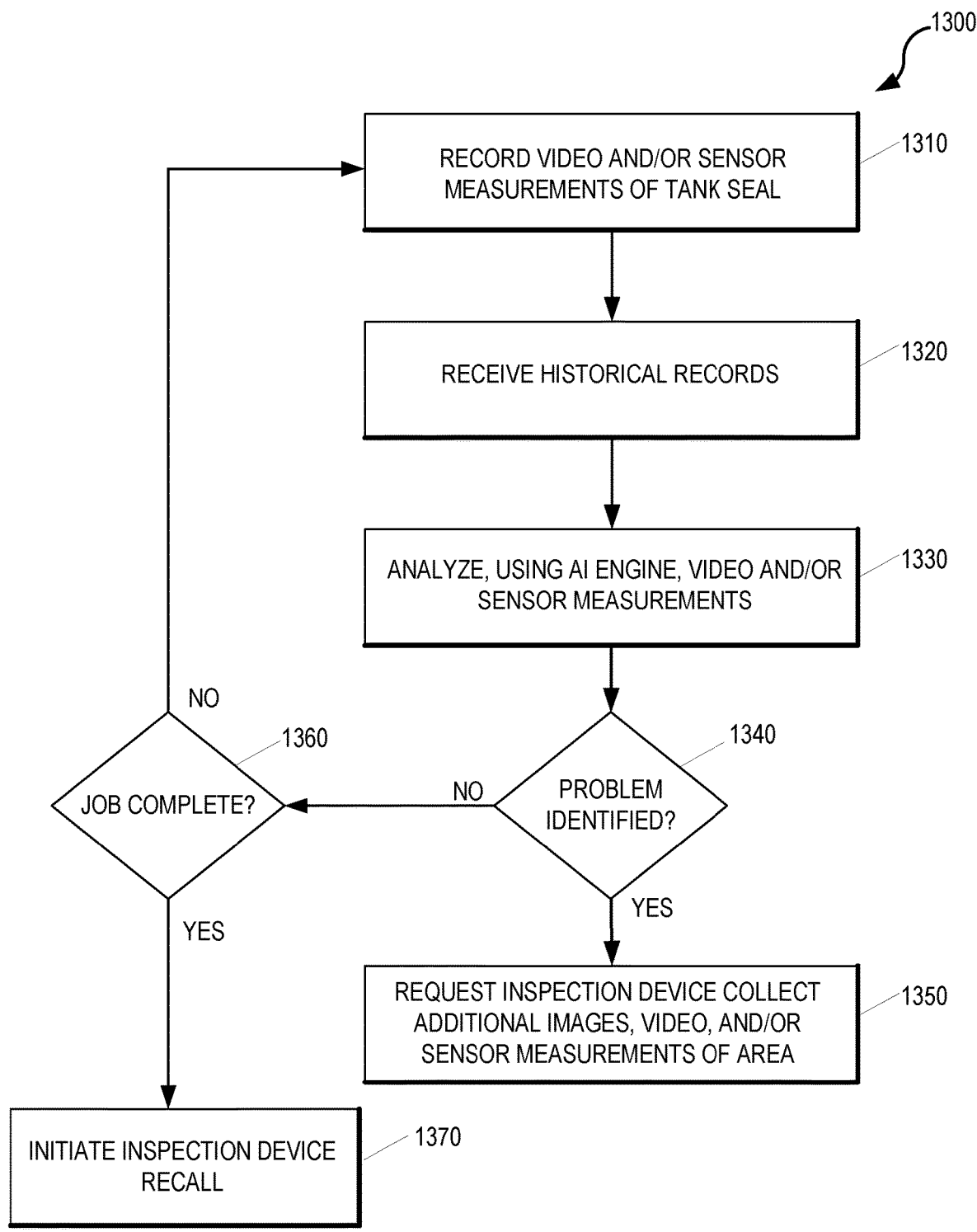
FIG. 13 is a flowchart illustrating an example of a set of operations for generating inspection data via the robotic inspection device in some embodiments of the present technology.

FIG. 13 is a flowchart illustrating an example of a set of operations 1300 for generating inspection data via the robotic inspection device in some embodiments of the present technology. Recording operation 1310 can record video and/or sensor measurements of the tank seal. In some embodiments, the recording operation may take still images with high resolution, use thermal imaging sensors, measurements using chemical sensors, and the like. In some embodiments, the recordings and measurements from the integrated sensors (e.g., cameras, LIDAR, depth sensors, stereovision, etc.) on the robotic inspection device may be stored locally and retrieved once the inspection is complete. In other embodiments, the recordings and measurements may be streamed back to a remote computing device where the results can be analyzed in real-time. This real-time analysis can allow for additional data to be collected in suspect areas or areas of interest. Recording operation 1310 may also format the data (e.g., video or sensor data) into compliant formats before storing or streaming the data.

During retrieval operation 1320, various historical records of the seal can be retrieved. The historical records can include installation dates, part numbers, manufacturing lots, previous inspection reports, video, and/or sensor data, chemicals stored within the tank, geographic location, and the like. Using, for example, a machine learning or artificial intelligence engine, analysis operation 1330 can analyze the current inspection data. The machine learning or artificial intelligence engine can ingest the historical records and the current measurements and identify possible failures within the seal. In some embodiments, the results may include a flag which can trigger additional real-time inspections (e.g., additional imaging or collection of sensor data). In accordance with various embodiments, the machine learning, artificial intelligence, or other decision-making engine can use one or more supervised, semi-supervised, or unsupervised learning techniques.

Determination operation 1330 takes the output from analysis operation 1330 and determines whether a problem has been identified. When determination operation 1340 determines a problem exists, then determination operation 1340 can branch to request operation 1350 where additional inspection data (e.g., additional images, video, and/or sensor measurements) of a particular area is requested. The robotic inspection device can process the request and collect additional inspection data for review by a human technician or by a machine learning or artificial intelligence engine. When determination operation 1340 determines that the analysis did not identify a problem, then determination operation 1340 can branch to completion decision 1360 where a determination can be made as to whether the job is complete. When completion decision operation 1360 determines that the job is not complete, then completion decision operation 1360 can branch to recording operation 1310 where another area of the seal is inspected. When completion decision operation 1360 determines that the job is complete, then completion decision operation 1360 can branch to recall operation 1370 where an inspection device recall is initiated. The recall may cause the robotic inspection device to return to the starting location to be retrieved by the operators. In some embodiments, the recall may cause the robotic inspection device to search for a beacon and navigate to that location.

Figure 14:
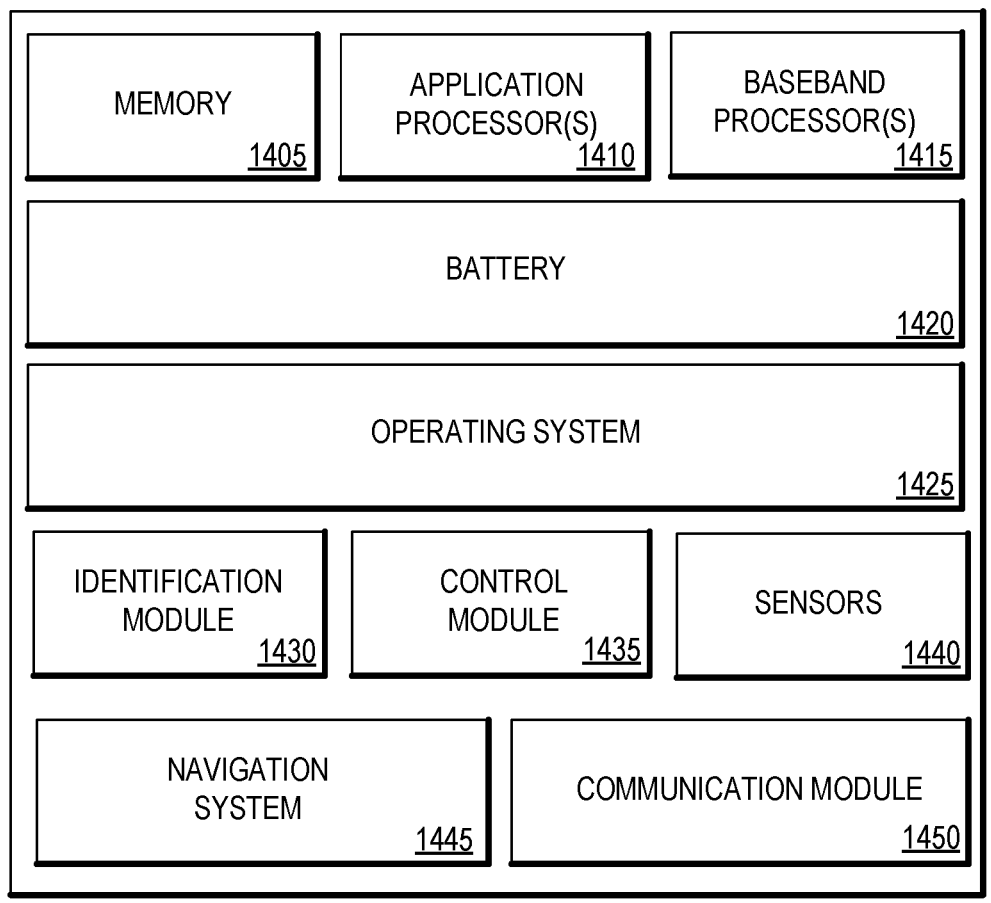
FIG. 14 illustrates a set of components of the robotic inspection device that may be used in various embodiments of the present technology.

FIG. 14 illustrates a set of components of the robotic inspection device that may be used in various embodiments of the present technology. According to the embodiments shown in FIG. 14, the robotic inspection device can include memory 1405, one or more processors (e.g., application processors 1410 and/or baseband processors 1415), power source 1420 (e.g., battery), operating system 1425, identification module 1430, control module 1435, sensors 1440, navigation system 1445, and communication module 1450. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 1405 can be any device, mechanism, or populated data structure used for storing information. In accordance with some embodiments of the present technology, memory 1405 can encompass any type of, but is not limited to, volatile memory, nonvolatile memory and dynamic memory. For example, memory 1405 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 1405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 1405.

Memory 1405 may be used to store instructions for running one or more applications or modules on processor(s) 1410. For example, memory 1405 could be used in one or more embodiments to house all or some of the instructions needed to execute the functionality of operating system 1425, identification module 1430, control module 1435, sensors 1440, navigation system 1445, and/or communication module 1450. Operating system 1425 can provide a software package that is capable of managing the hardware resources of the robotic inspection device. Operating system 1425 can also provide common services for software applications running on application processor(s) 1410.

Identification module 1430 may analyze the sensor data in real-time to identify any faults with the seal. Control module 1435 can control the operations of the robotic inspection device. For example, control module may control magnets for coupling the device to the wall of the tank, sensors 1440, and/or navigation system 1445 which can control the drive wheels. Communication module 1450 can transmit and receive signals between the robotic inspection device and an external computing platform (e.g., laptop, cloud-based inspection platform, etc.).

Figure 15:
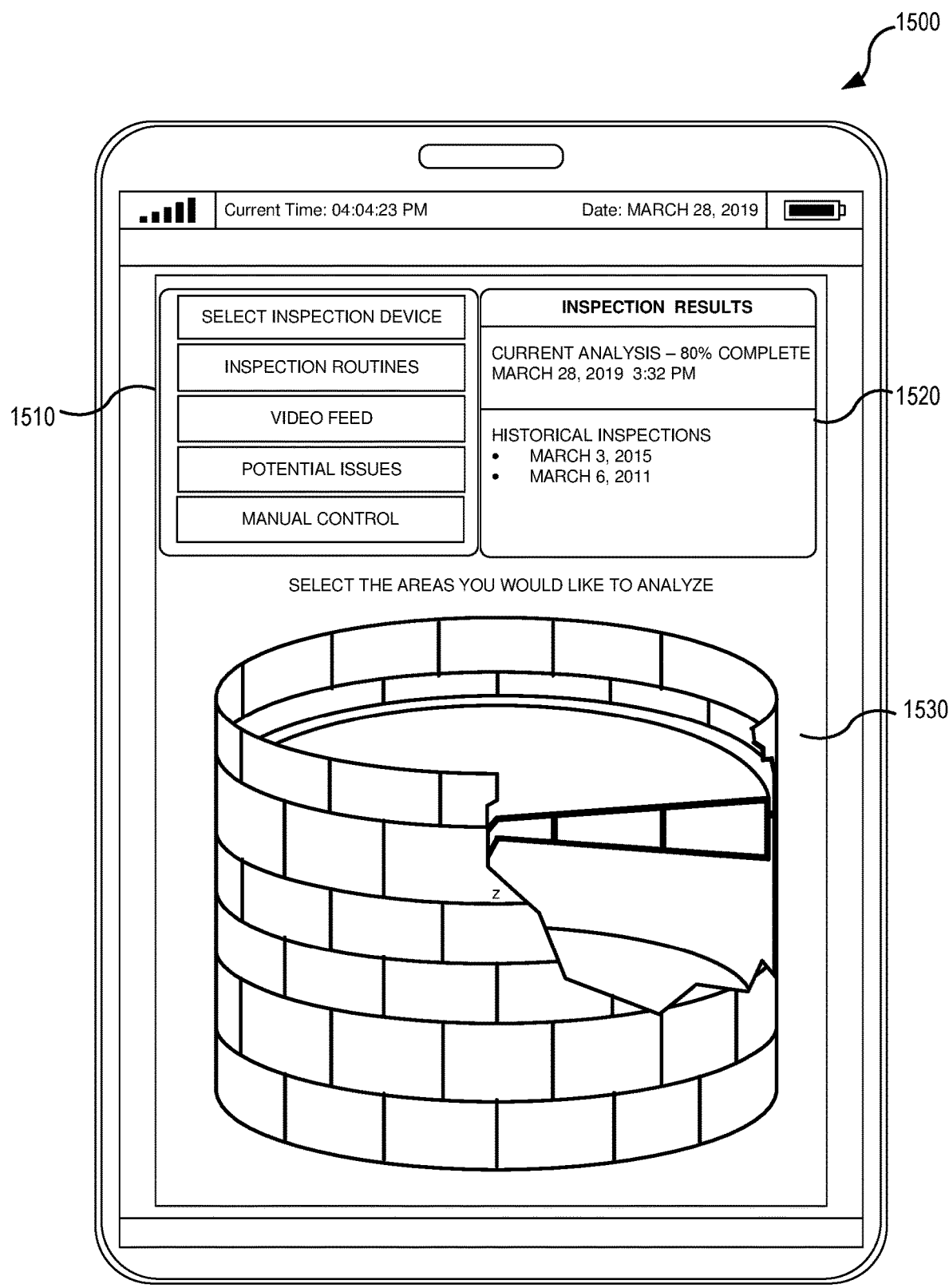
FIG. 15 illustrates an example of a graphical user interface that may be used in one or more embodiments of the present technology.

FIG. 15 illustrates an example of a graphical user interface 1500 that may be used in one or more embodiments of the present technology. Graphical user interface 1500 may include a control panel 1510 that allows the user to select the inspection device, inspection routines, view of video feed, see identified issues, and/or control the robotic inspection device manually. Inspection panel 1520 can all the user to see the status of the current inspection results and/or view historical records. Data panel 1530 can display the selections of the user. For example, data panel 1530 can display the historical inspection results, live video feed, sensor data, and the like as selected by the user.

Figure 16A:
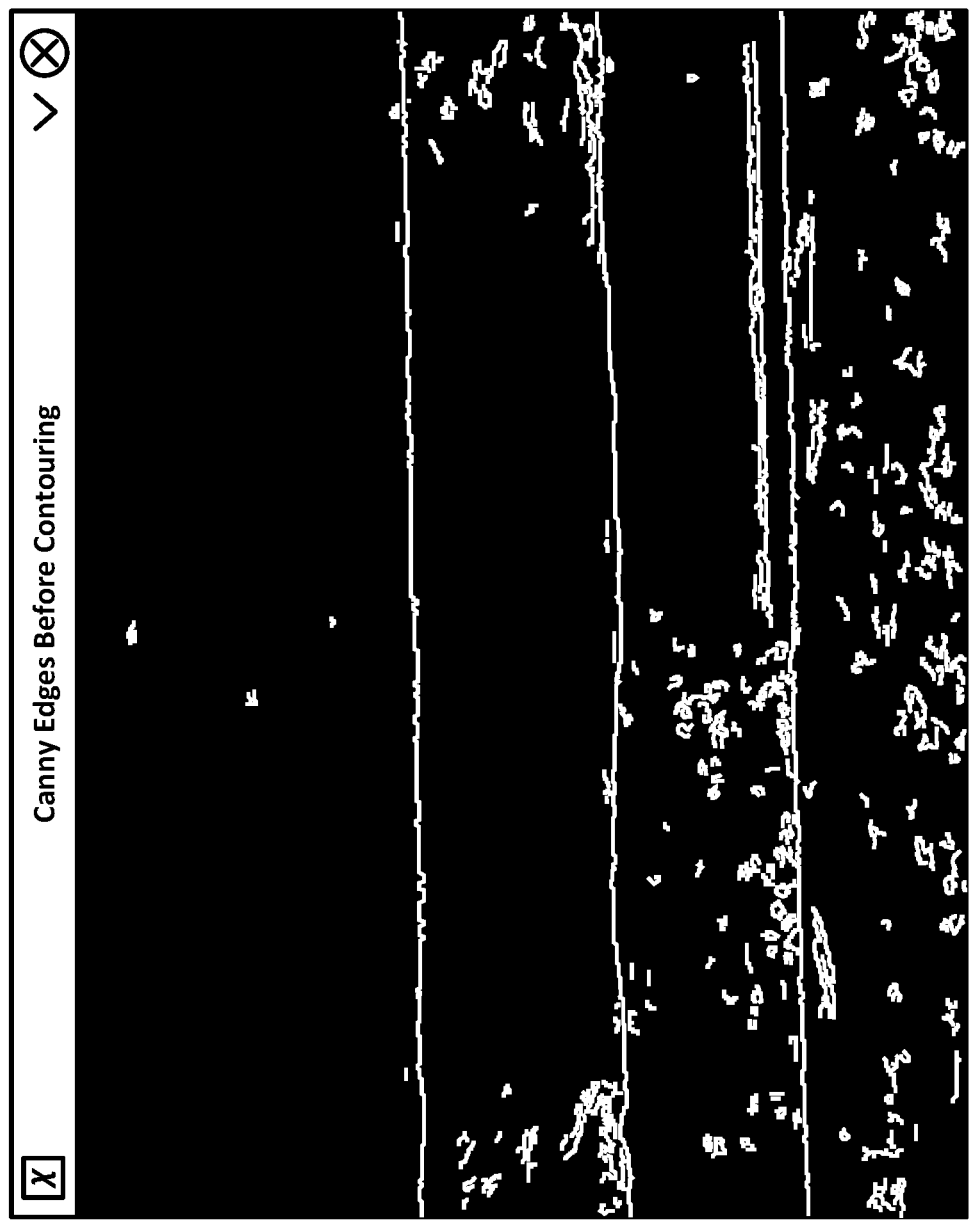
FIG. 16A-16C illustrates example of images collected and processed to identify degradation of a seal according to some embodiments of the present technology.
Figure 16B:
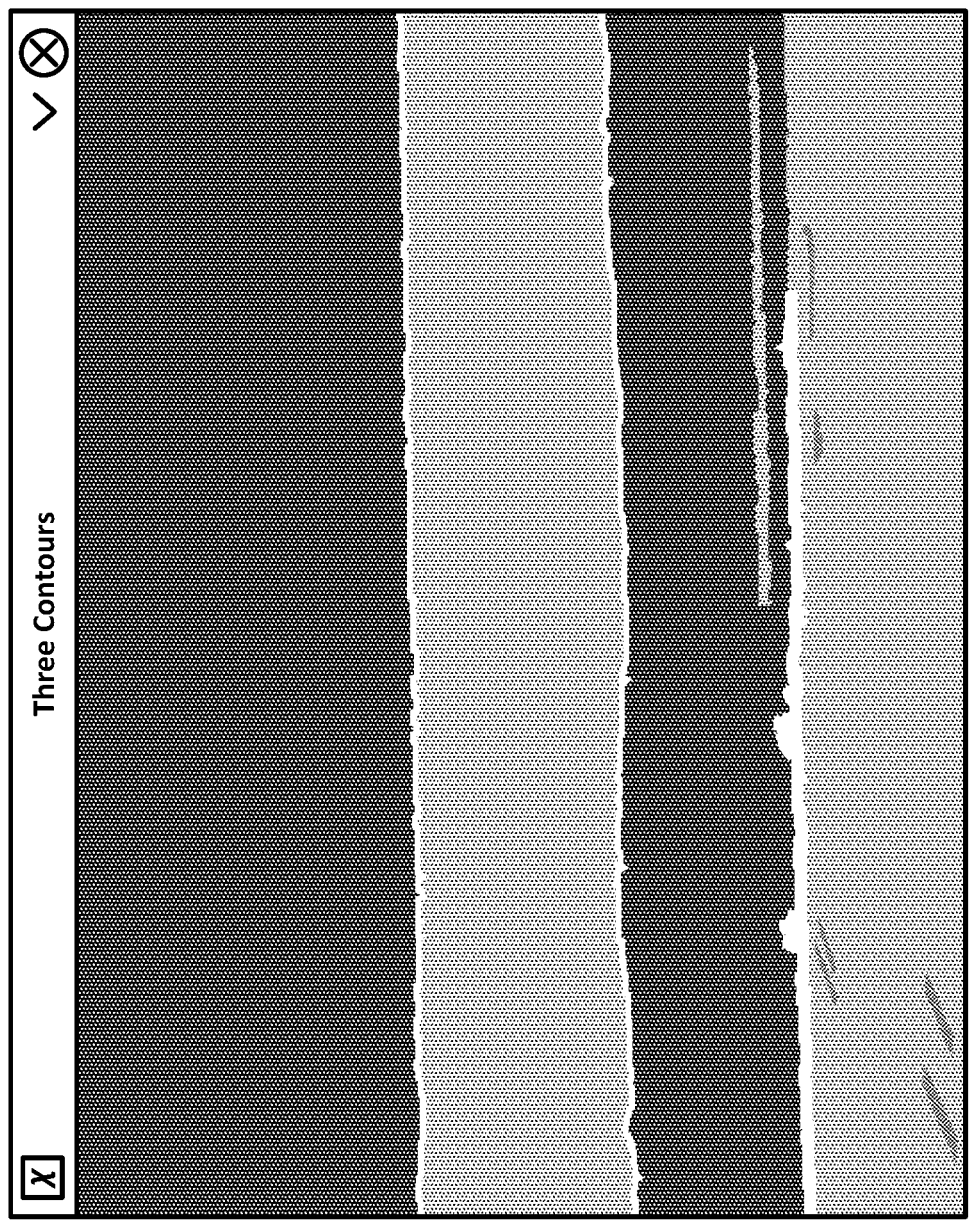
Figure 16C:
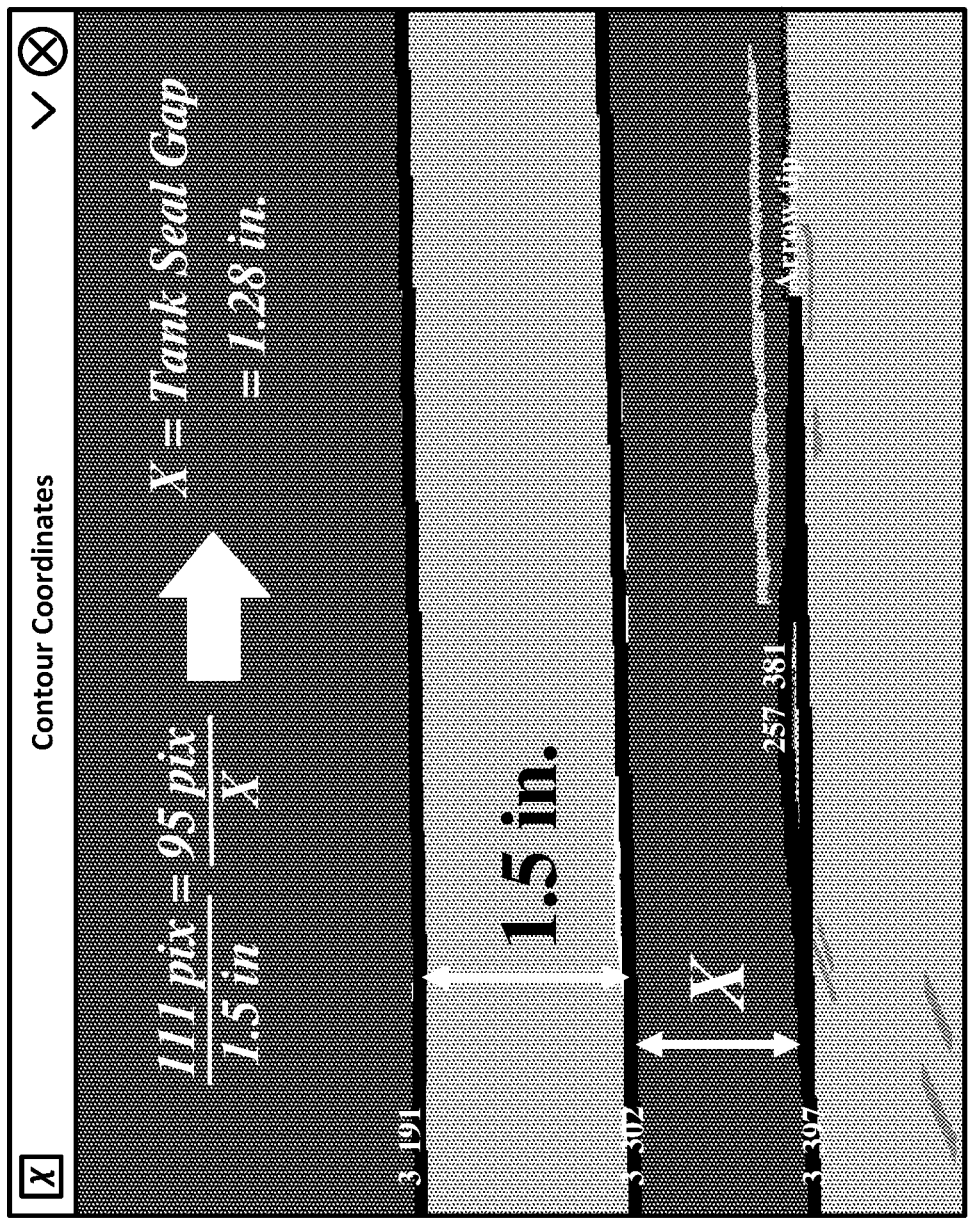

FIG. 16A-16C illustrates example of images collected and processed to identify degradation of a seal according to some embodiments of the present technology. These are example output of the edge detection method which allows the vehicle to determine the gap width between the seal and the tank wall.

Figure 17A:
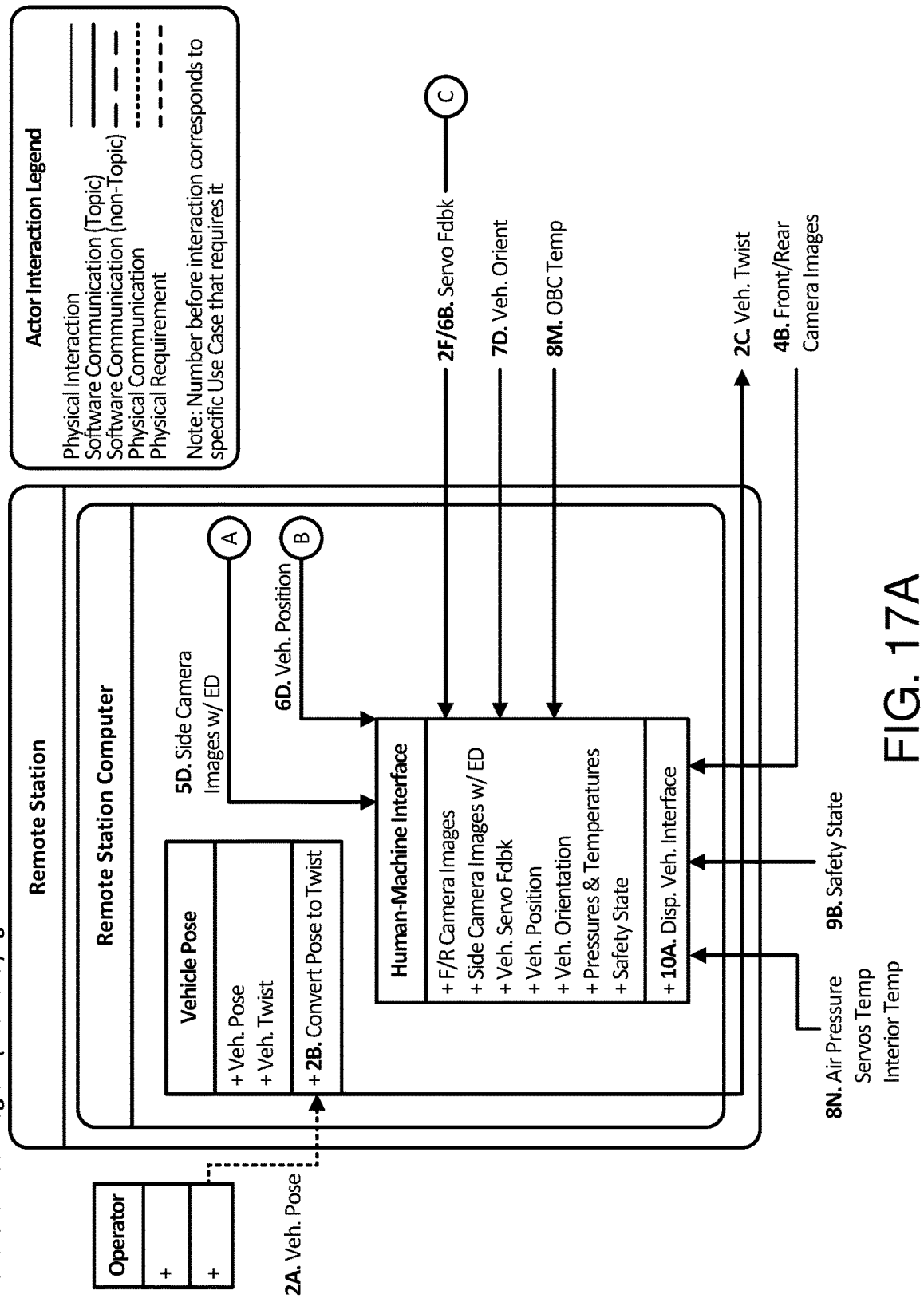
FIGS. 17A-17B illustrate examples of functional block diagrams illustrating logical interconnections that may be created between various components of the robotic inspection device according to various embodiments of the present technology.
Figure 17A:
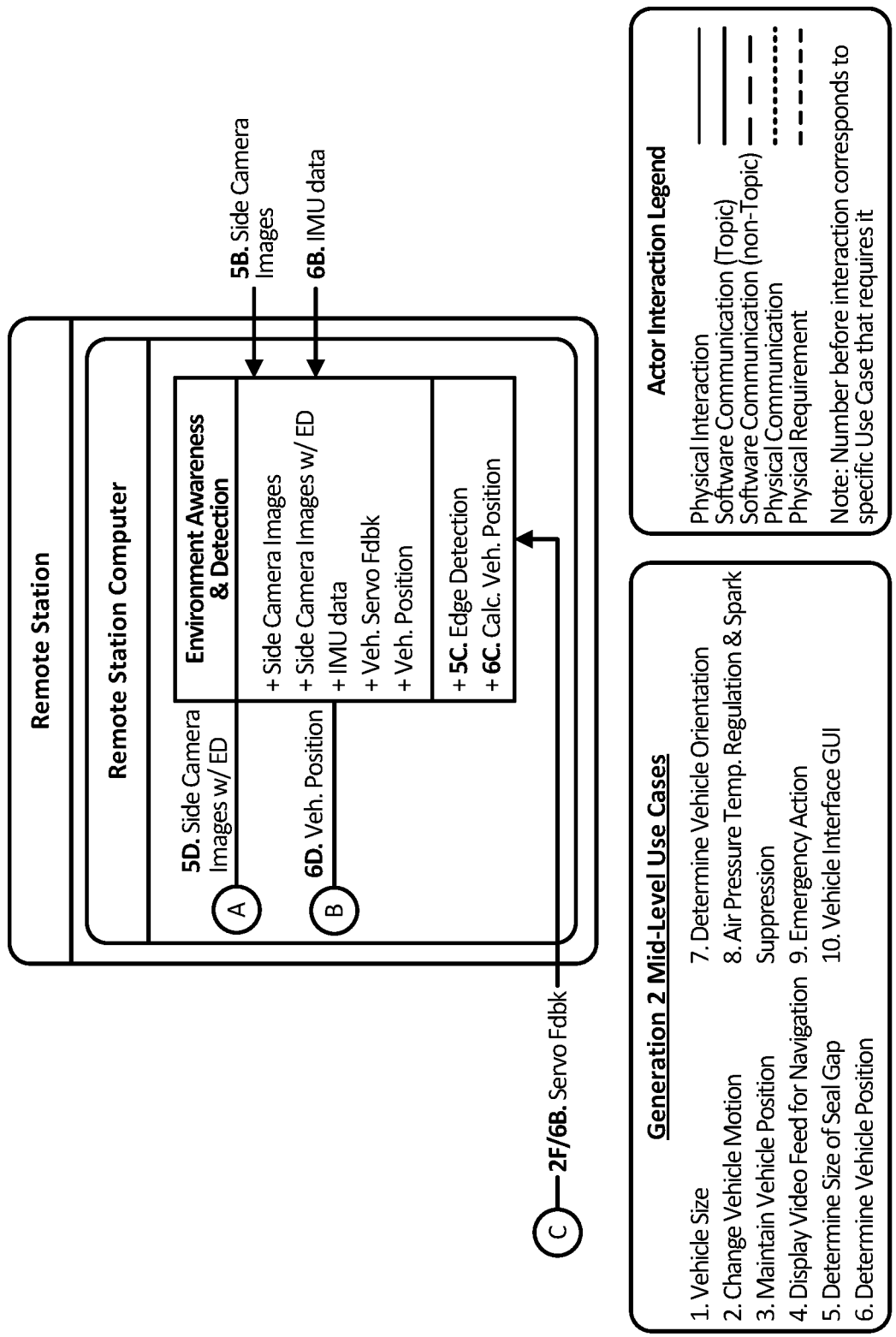
Figure 17B:
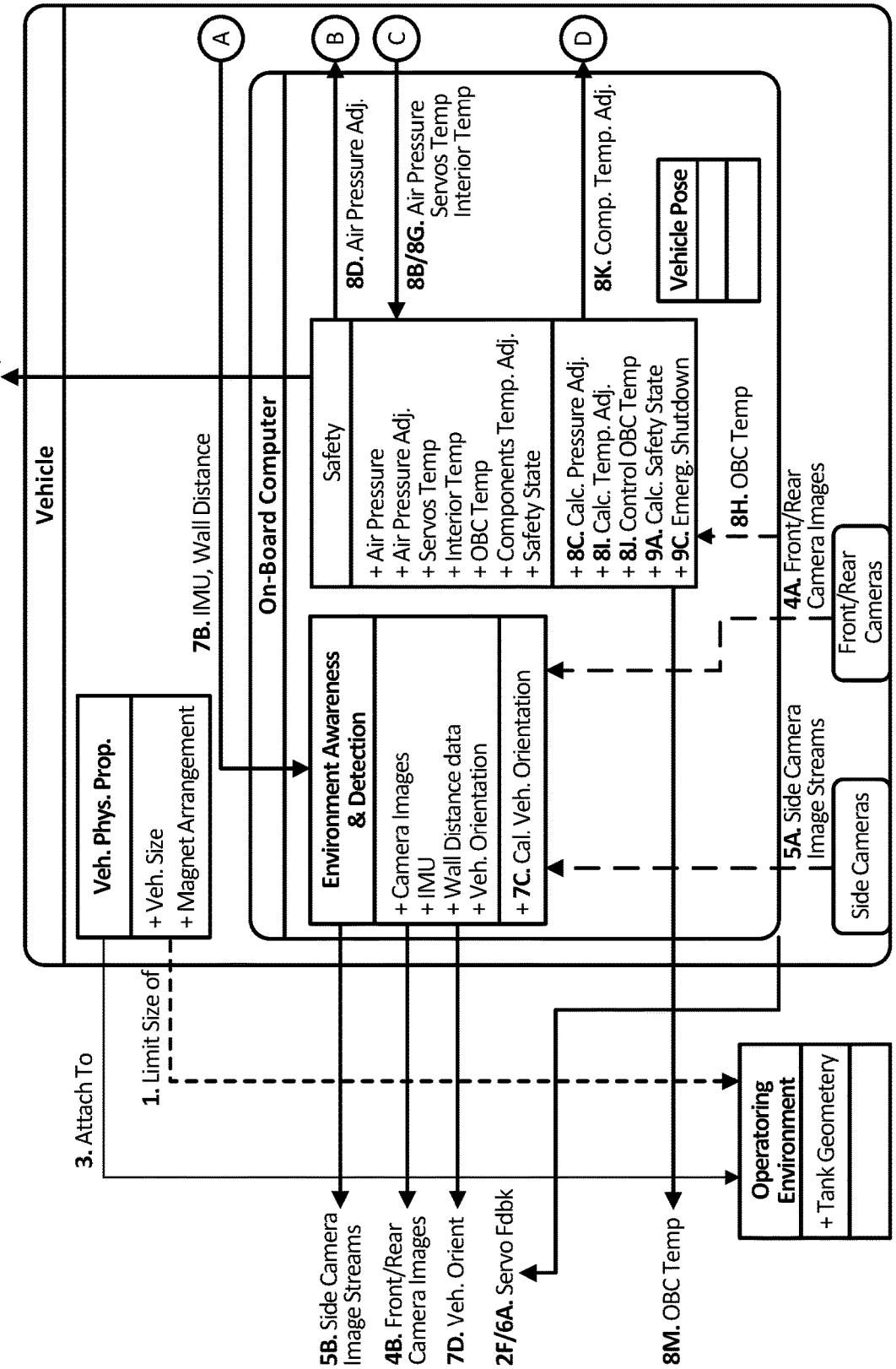
Figure 17B:
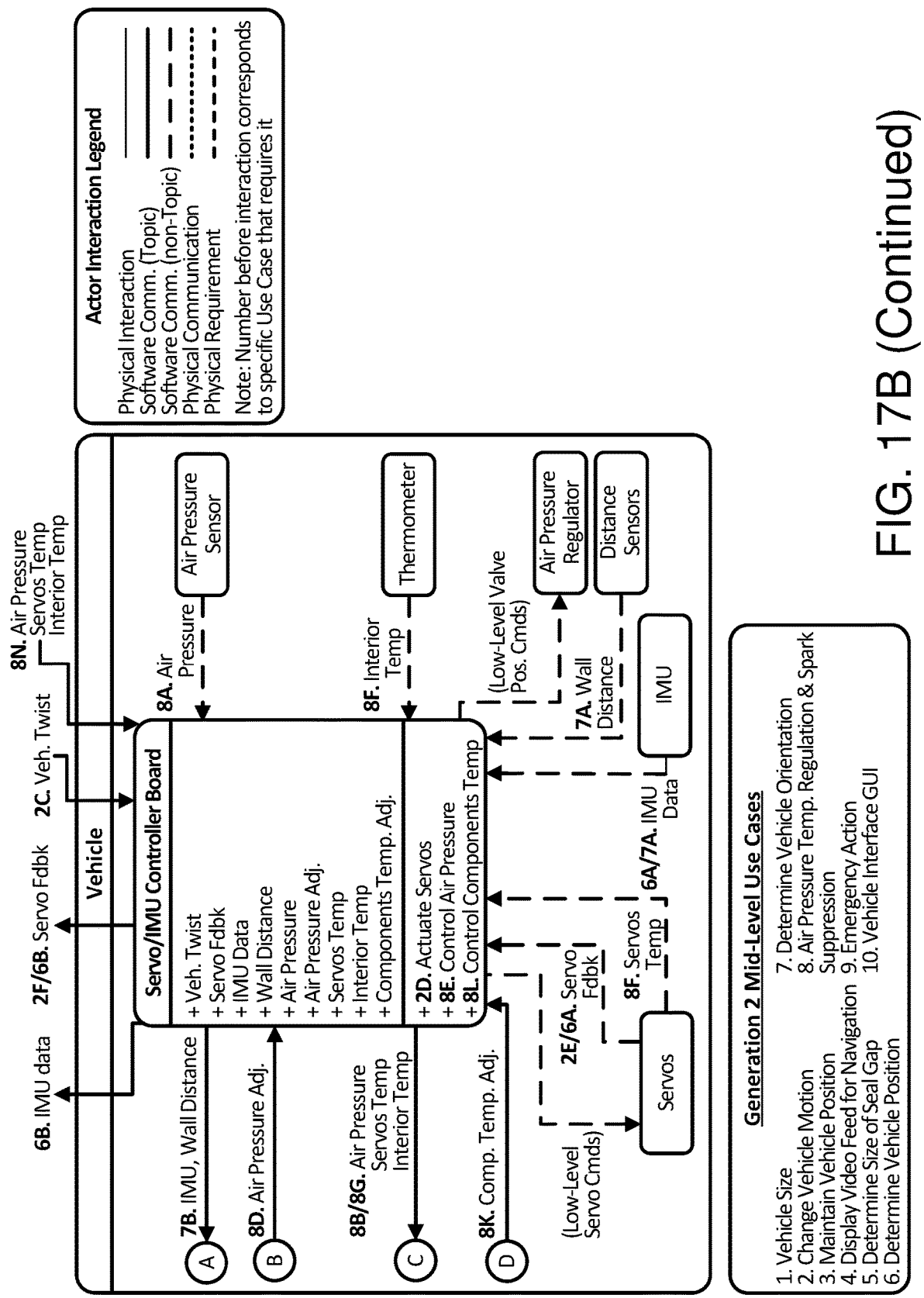

FIGS. 17A-17B illustrate examples of functional block diagrams illustrating logical interconnections that may be created between various components of the robotic inspection device according to various embodiments of the present technology.

Exemplary Computer System Overview

Aspects and implementations of the inspection system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 18:
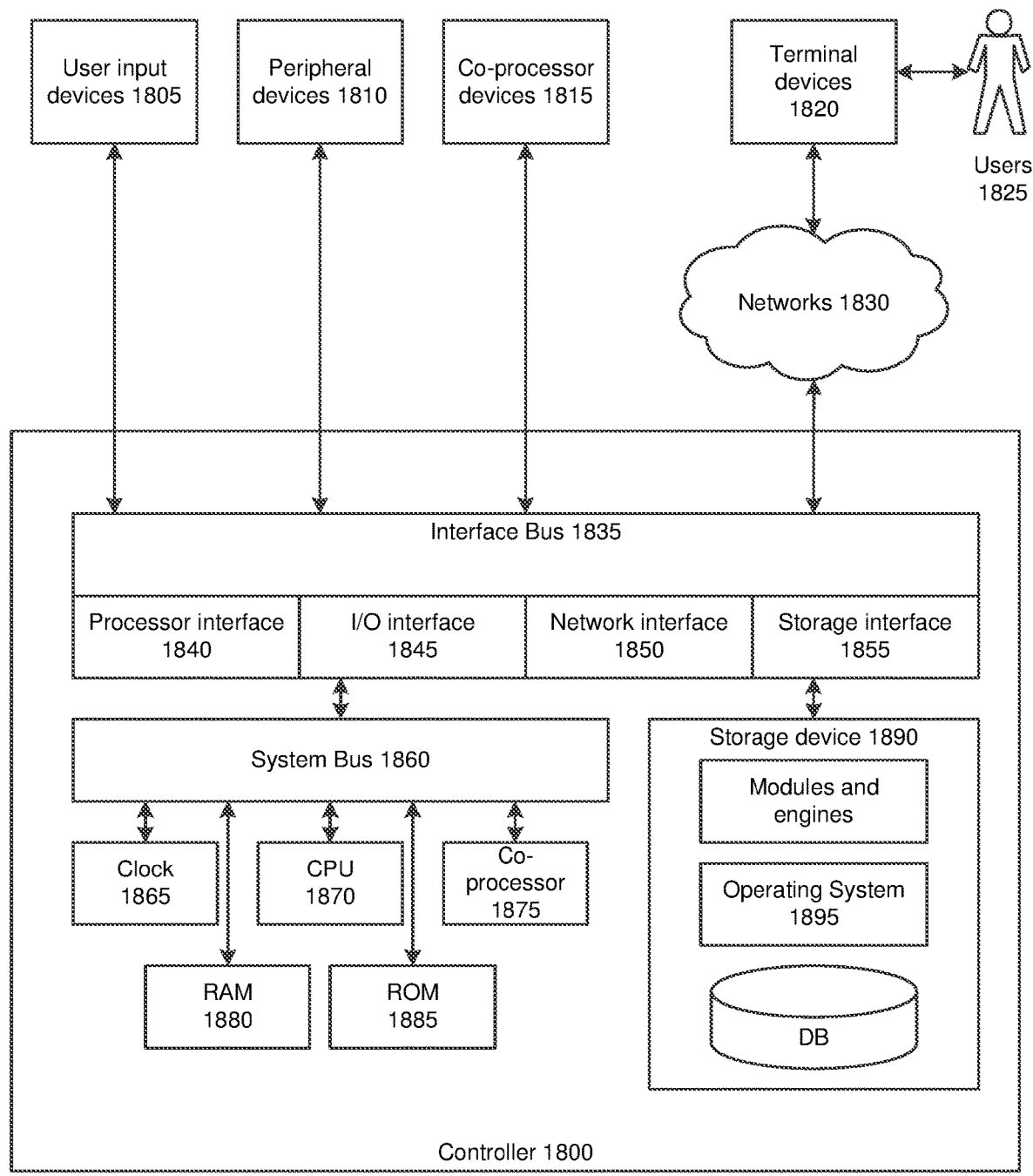
FIG. 18 illustrates an example of a computer architecture that may be used in some embodiments of the present technology.

FIG. 18 is a block diagram illustrating an example machine representing the computer systemization of the inspection platform. The controller 1800 may be in communication with entities including one or more users 1825 client/terminal devices 1820, user input devices 1805, peripheral devices 1810, an optional co-processor device(s) (e.g., cryptographic processor devices) 1815, and networks 1830. Users may engage with the controller 1800 via terminal devices 1820 over networks 1830.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1800 may include clock 1865, CPU 1870, memory such as read only memory (ROM) 1885 and random access memory (RAM) 1880 and co-processor 1875 among others. These controller components may be connected to a system bus 1860, and through the system bus 1860 to an interface bus 1835. Further, user input devices 1805, peripheral devices 1810, co-processor devices 1815, and the like, may be connected through the interface bus 1835 to the system bus 1860. The interface bus 1835 may be connected to a number of interface adapters such as processor interface 1840, input output interfaces (I/O) 1845, network interfaces 1850, storage interfaces 1855, and the like.

Processor interface 1840 may facilitate communication between co-processor devices 1815 and co-processor 1875. In one implementation, processor interface 1840 may expedite encryption and decryption of requests or data. Input output interfaces (I/O) 1845 facilitate communication between user input devices 1805, peripheral devices 1810, co-processor devices 1815, and/or the like and components of the controller 1800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1850 may be in communication with the network 1830. Through the network 1830, the controller 1800 may be accessible to remote terminal devices 1820. Network interfaces 1850 may use various wired and wireless connection protocols such as, direct connect, Ethernet, wireless connection such as IEEE 802.11a-x, and the like.

Examples of network 1830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1855 may be in communication with a number of storage devices such as, storage devices 1890, removable disc devices, and the like. The storage interfaces 1855 may use various connection protocols such as Serial Advanced Technology Attachment (SATA), IEEE 1394, Ethernet, Universal Serial Bus (USB), and the like.

User input devices 1805 and peripheral devices 1810 may be connected to I/O interface 1845 and potentially other interfaces, buses and/or components. User input devices 1805 may include card readers, fingerprint readers, joysticks, keyboards, microphones, mouse, remote controls, retina readers, touch screens, sensors, and/or the like. Peripheral devices 1810 may include antenna, audio devices (e.g., microphone, speakers, etc.), cameras, external processors, communication devices, radio frequency identifiers (RFIDs), scanners, printers, storage devices, transceivers, and/or the like. Co-processor devices 1815 may be connected to the controller 1800 through interface bus 1835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1800 may employ various forms of memory including on-chip CPU memory (e.g., registers), RAM 1880, ROM 1885, and storage devices 1890. Storage devices 1890 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 1895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1800 may be distributed electronically over the Internet or over other networks (including wireless networks). Those skilled in the relevant art(s) will recognize that portions of the system may reside on a server computer, while corresponding portions reside on a client computer. Data structures and transmission of data particular to aspects of the controller 1800 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a robotic inspection device, the method comprising:
   receiving, from an external source, an inspection signal requesting the robotic inspection device inspect a seal between a floating lid and a wall of a tank;
   activating a magnetic coupling between the robotic inspection device and the wall of the tank;
   navigating the robotic inspection device so that a camera within the robotic inspection device can view the seal;
   recording, using the camera, images or video of the seal as the robotic inspection device traverses the wall of the tank; and
   transmitting the images or video of the seal to an external computing device that creates a three-dimensional model of the seal.

2. The method of claim 1, further comprising analyzing, using an artificial intelligence, machine learning engine, or supervisory controller, the images or video of the seal recorded by the camera.

3. The method of claim 1, wherein the inspection signal includes parameters representing tank dimensions, selected inspection routines, identified areas of interest, areas to avoid, communication channel information, location/tank information, external weather conditions, maximum inspection times, or waypoints.

4. The method of claim 1, further comprising lowering, using a hydraulic lift, the robotic inspection device into an initial position within the tank.

5. The method of claim 1, wherein the robotic inspection device operates in a set of states including a setup state, an inspection state, and a failsafe state.

6. The method of claim 5, further comprising:
monitoring for a failure in a primary power supply providing power to the robotic inspection device; and
transitioning, upon detection of the failure in the primary power supply, a current state of operation of the robotic inspection device to a failsafe state that activate the magnetic coupling between the robotic inspection device and the wall of the tank.

* * * * *